United States Patent
Kawai et al.

(10) Patent No.: US 12,081,127 B2
(45) Date of Patent: Sep. 3, 2024

(54) POWER CONVERSION DEVICE

(71) Applicant: Mitsubishi Electric Corporation, Tokyo (JP)

(72) Inventors: Yu Kawai, Tokyo (JP); Hirokazu Nakabayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 364 days.

(21) Appl. No.: 17/619,604

(22) PCT Filed: Aug. 21, 2019

(86) PCT No.: PCT/JP2019/032678
§ 371 (c)(1),
(2) Date: Dec. 16, 2021

(87) PCT Pub. No.: WO2021/033295
PCT Pub. Date: Feb. 25, 2021

(65) Prior Publication Data
US 2022/0368232 A1    Nov. 17, 2022

(51) Int. Cl.
*H02M 3/158*    (2006.01)
*H02M 1/00*    (2006.01)

(52) U.S. Cl.
CPC ........ *H02M 3/1582* (2013.01); *H02M 1/0058* (2021.05); *H02M 3/1586* (2021.05)

(58) Field of Classification Search
CPC .................................................. H02M 3/1582
See application file for complete search history.

(56) References Cited

U.S. PATENT DOCUMENTS

| 2004/0113597 | A1 | 6/2004 | Miyazaki |
| 2016/0065054 | A1* | 3/2016 | Li ................ H02M 3/158 363/89 |
| 2016/0087545 | A1 | 3/2016 | Higaki et al. |
| 2017/0077817 | A1* | 3/2017 | Houston ............ H02M 3/1582 |

FOREIGN PATENT DOCUMENTS

| JP | 2004-153965 A | 5/2004 |
| JP | 2013-27201 A | 2/2013 |
| WO | 2015/004825 A1 | 1/2015 |

OTHER PUBLICATIONS

International Search Report and Written Opinion mailed on Nov. 5, 2019, received for PCT Application PCT/JP2019/032678, Filed on Aug. 21, 2019, 6 pages including English Translation.

* cited by examiner

*Primary Examiner* — Peter M Novak
(74) *Attorney, Agent, or Firm* — XSENSUS LLP

(57) ABSTRACT

A power conversion device includes: a switching circuit; a signal generator to generate a switching signal of a switching element based on a first instruction value; a current controller to generate a second instruction value based on a deviation between a current target value and the current flowing through the switching circuit such that the current flowing through the switching circuit approaches the current target value; an operation mode detector to detect an operation mode based on the first instruction value; and a compensator to adjust the second instruction value so as to compensate a gain between the deviation and an amount of a change in the current of the switching circuit. The compensator adjusts the second instruction value so as to suppress a change in the gain based on the operation mode, and outputs the first instruction value.

8 Claims, 34 Drawing Sheets

[CHARGE MODE-CURRENT STATE 3]

FIG.38 ENLARGEMENT OF Idc INSTRUCTION STEP-DOWN

FIG.39 ENLARGEMENT OF Idc INSTRUCTION STEP-UP

POWER CONVERSION DEVICE

CROSS-REFERENCE TO RELATED APPLICATION

The present application is based on PCT filing PCT/JP2019/032678, filed Aug. 21, 2019, the entire contents of which are incorporated herein by reference.

TECHNICAL FIELD

The present disclosure relates to a power conversion device.

BACKGROUND ART

With the spread of solar power generation and electric vehicles, there is an increasing need to connect the solar power generation or a battery of an electric vehicle to a house and a factory. However, a solar cell and the battery of electric vehicles have various configurations in order to cope with various installation constraints. For example, such constraints are an area, a volume, a weight, and the like that can be implemented. Because of various configurations (e.g., series and parallel connections as well as electrochemical reactions), DC voltages of these batteries are not uniformly determined. Accordingly, a power conversion device connecting the battery and the house or the factory requires a wide usable range of the DC voltage on the battery side and excellent electric conversion efficiency. In order to implement multi-functionality of the power conversion device, a technique for switching a circuit, a technique using a different operation instruction generation method, and the like have been devised, and various measures to improve a change in a characteristic of a current control system accompanying introduction of such a technique have been devised.

Japanese Patent Laying-Open No. 2004-153965 (PTL 1) discloses a switching circuit configured to switch a step-up chopper and a step-down chopper and an instruction value generation method corresponding to the circuit as a technique for mitigating the change in the characteristic of a current control system in a case where operation instructions are different.

CITATION LIST

Patent Literature

PTL 1: Japanese Patent Laying-Open No. 2004-153965

SUMMARY OF INVENTION

Technical Problem

Because the circuit disclosed in Japanese Patent Laying-Open No. 2004-153965 (PTL 1) has the configuration in which an instruction value is determined depending on an input voltage and an output voltage, there is a problem in that the change in the characteristic of the current control system due to a circuit change, an instruction change, or the like caused by switching of an operation mode or the like cannot be mitigated when a function of adjusting current on an input side or an output side is introduced.

The present disclosure has been made to solve the above problem, and an object of the present disclosure is to suppress the change in the characteristic of the current control system of the power conversion device, which is generated during the change in the operation mode.

Solution to Problem

The present disclosure relates to a power conversion device. A power conversion device includes: a switching circuit to receive an input voltage to output an output voltage; a signal generator to generate a switching signal of a switching element included in the switching circuit based on a first instruction value; a current controller to generate a second instruction value based on a deviation between a current target value and the current flowing through the switching circuit such that the current flowing through the switching circuit approaches the current target value; an operation mode detector to detect an operation mode of the switching circuit based on the first instruction value; and a compensator to adjust the second instruction value so as to compensate a gain that is a ratio between the deviation and an amount of a change in the current of the switching circuit. The compensator is configured to adjust the second instruction value so as to suppress a change in the gain based on the operation mode detected by the operation mode detector, and outputs the first instruction value.

Advantageous Effects of Invention

The power conversion device disclosed in the present disclosure can suppress the change in the characteristic of the current control system caused by the change in the operation state, the switching of the circuit, the change in the operation instruction generation method, or the like in order to compensate the instruction value according to the operation mode.

DESCRIPTION OF EMBODIMENTS

Figure 1:
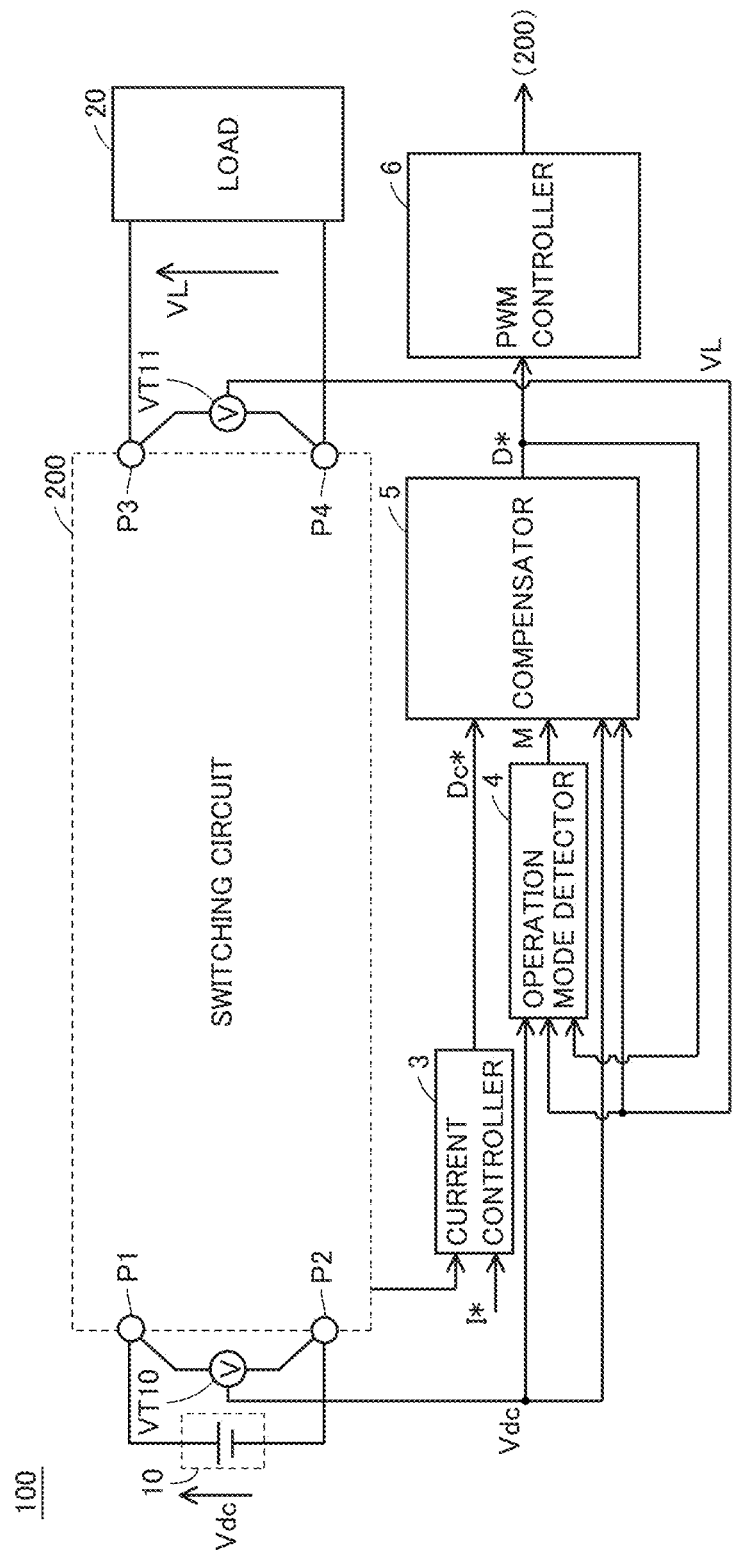
FIG. 1 is a functional block diagram illustrating a configuration of a power conversion device 100 according to a first embodiment.

Hereinafter, embodiments of the present disclosure will be described in detail with reference to the drawings. In the drawings, the same or corresponding portion is denoted by the same reference numeral, and the description thereof will not generally be repeated.

First Embodiment

FIG. 1 is a functional block diagram illustrating a configuration of a power conversion device 100 according to a first embodiment. The functional block diagram is common to a second embodiment. As illustrated in FIG. 1, power conversion device 100 includes a first terminal P1, a second terminal P2, a third terminal P3, a fourth terminal P4, a switching circuit 200, a current controller 3, an operation mode detector 4, a compensator 5, and a pulse width modulation (PWM) controller 6.

Compensator 5 adjusts an instruction value Dc* output from current controller 3 that adjusts the current of switching circuit 200. PWM controller 6 generates a switching signal in order that switching circuit 200 converts a voltage level of a DC power supply 10 and output the voltage level to a load 20. Compensator 5 may adjust gain of a current control system including the current controller 3.

First terminal P1 and second terminal P2 are connected to a positive electrode and a negative electrode of DC power supply 10, respectively. The voltage of DC power supply 10 is voltage Vdc. For example, DC power supply 10 is a constant voltage source such as a battery or a control voltage source such as a power converter capable of outputting a DC current.

Third terminal P3 and fourth terminal P4 are connected to load 20. For example, a consumption load such as a resistive load or a rectifier load, a constant voltage source such as a battery, or a control voltage source of a power converter capable of outputting DC current corresponds to load 20.

The configuration of power conversion device 100 may be such that switching circuit 200 acts as DC power supply 10 or the control voltage source of load 20. In addition, power conversion device 100 may have a configuration in which DC power supply 10 and load 20 are switched.

Figure 2:
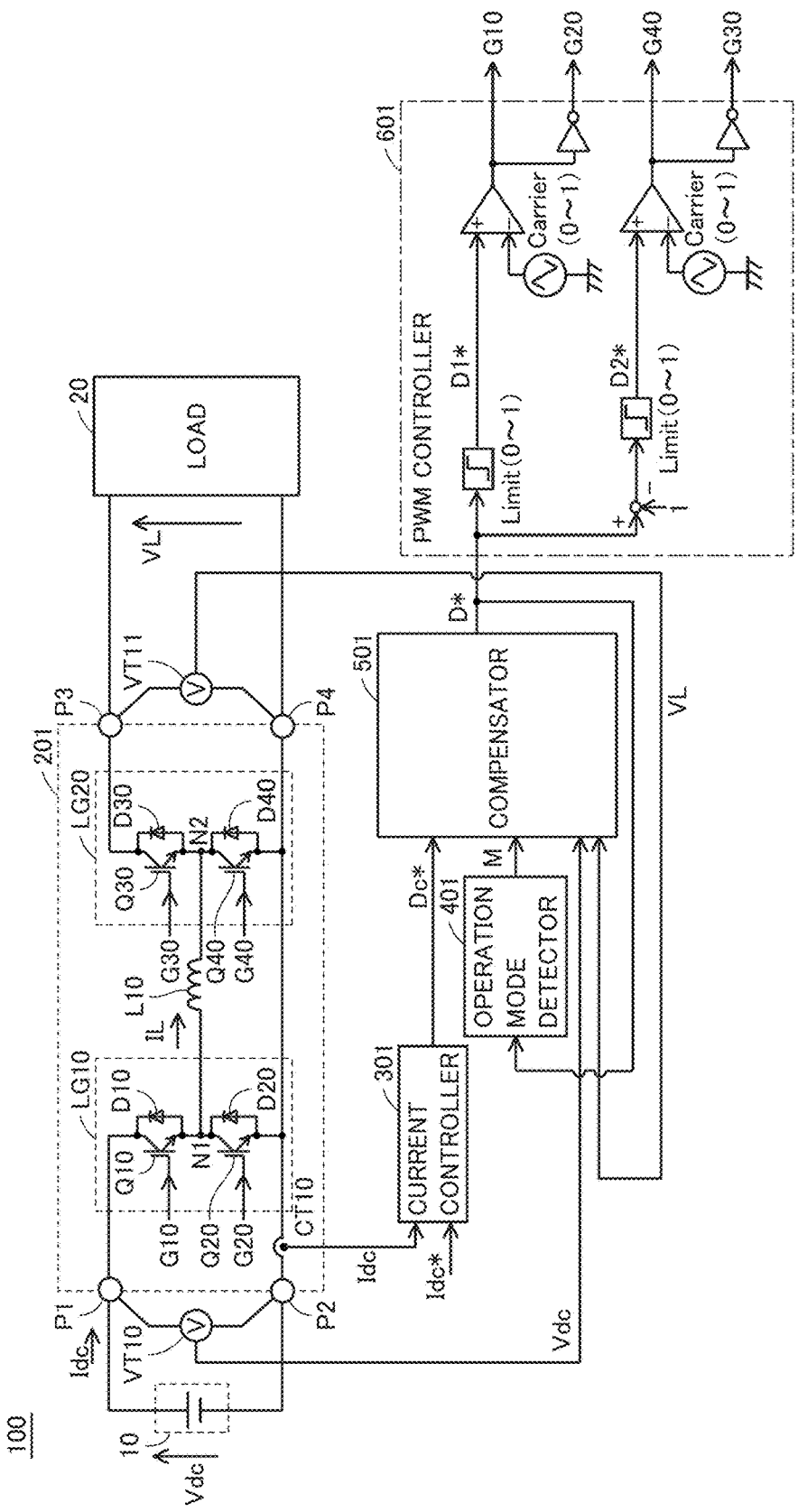
FIG. 2 is a circuit diagram illustrating details of the power conversion device 100 of the first embodiment.

Current controller 3 adjusts the current of switching circuit 200. With reference to FIG. 2, a specific configuration of switching circuit 200 will be described later.

Operation mode detector 4 estimates a change in the characteristic of the current control system of switching circuit 200 using at least one of the current of the adjustment target of current controller 3, the voltage at DC power supply 10, the voltage at load 20, or duty instruction value D* given to PWM controller 6.

Compensator 5 adjusts instruction value Dc* output from current controller 3 using an estimation result of operation mode detector 4.

PWM controller 6 generates an on and off signal of a switching element of switching circuit 200 using the output D* of current controller 3 adjusted by compensator 5.

FIG. 2 is a circuit diagram illustrating details of power conversion device 100 of the first embodiment. FIG. 2 illustrates a configuration when a bidirectional non-insulating converter 201, which can perform a step-up operation and a step-down operation, charge DC power supply 10, and discharge from DC power supply 10, is used as switching circuit 200 in FIG. 1. In FIG. 2, a current controller 301, an operation mode detector 401, a compensator 501, and a PWM controller 601 are used as current controller 3, operation mode detector 4, compensator 5, and PWM controller 6 in FIG. 1, respectively.

Bidirectional non-insulating converter 201 includes a first leg LG10, a second leg LG20, a reactor L10, a current sensor CT10, a voltage sensor VT10, and a voltage sensor VT11. Bidirectional non-insulating converter 201 operates in either a step-down mode operating at Vdc>VL or a step-up mode operating at Vdc<VL.

First leg LG10 includes an upper arm Q10, a lower arm Q20, and free wheel diodes D10, D20. Upper arm Q10 and lower arm Q20 are connected in series between first terminal P1 and second terminal P2. Freewheel diode D10 is connected in antiparallel with upper arm Q10. Freewheel diode D20 is connected in antiparallel with lower arm Q20.

Second leg LG20 includes an upper arm Q30, a lower arm Q40, and free wheel diodes D30, D40. Upper arm Q30 and lower arm Q40 are connected in series between third terminal P3 and fourth terminal P4. Freewheel diode D30 is connected in antiparallel with upper arm Q30. Freewheel diode D40 is connected in antiparallel with lower arm Q40.

Reactor L10 is installed in a path connecting a first connection point N1 between upper arm Q10 and lower arm Q20 and a second connection point N2 between upper arm Q30 and lower arm Q40.

Current sensor CT10 detects current Idc flowing from first leg LG10 to second terminal P2. Instead of the current flowing from first leg LG10 to second terminal P2, current flowing from first terminal P1 to first leg LG10 may be detected.

Voltage sensor VT10 detects a potential difference Vdc between first terminal P1 and second terminal P2. Voltage sensor VT11 detects a potential difference VL between third terminal P3 and fourth terminal P4.

When bidirectional non-insulating converter 201 operates in the step-down mode, switching control is performed such that upper arm Q10 and lower arm Q20 are alternately conducted, and such that upper arm Q30 and lower arm Q40 are not conducted. When bidirectional non-insulating converter 201 operates in the step-up mode, switching control is performed such that upper arm Q30 and lower arm Q40 are alternately conducted, and upper arm Q10 and lower arm Q20 are not conducted.

For example, a self-arc-extinguishing semiconductor switching element typified by an insulated gate bipolar transistor (IGBT) or a metal oxide semiconductor field effective transistor (MOSFET) can be used as upper arms Q10. Q30 and lower arms Q20, Q40. When the MOSFET is used as upper arms Q10, Q30 and lower arms Q20, Q40, a parasitic diode of the MOSFET may be used instead of free wheel diodes D10 to D40.

The switching signals G10, G20, G30, G40 controlling the on and off of upper arms Q10, Q30 and lower arms Q20. Q40 are generated through current controller 301, operation mode detector 401, compensator 501, and PWM controller 601.

Current controller 301 adjusts a duty instruction value Dc* such that the detection value of current sensor CT10 that measures current Idc approaches a target value Idc*. In order to suppress a switching ripple component of current Idc, average value processing may be performed on the detection value of current sensor CT10 for each carrier period, or a low pass filter (LPF) may be provided in a path connecting current sensor CT10 and current controller 301.

Based on duty instruction value D* transmitted to PWM controller 601, operation mode detector 401 estimates whether the operation mode of bidirectional non-insulating converter 201 is operated in the step-up mode or the step-down mode, and outputs an estimation result M of the operation mode. For example, operation mode detector 401 detects the switching between the step-up operation and the step-down operation with duty instruction value D* of 1 as a boundary. Because the operation mode that is of the estimation target is affected by a manufacturing error or a dead time of the circuit parameter, the estimation result and the operation mode of the actual circuit may not be necessarily strictly matched with each other.

Table 1 illustrates an operation mode detected by operation mode detector 401 in the configuration of FIG. 2.

TABLE 1

Table 1
First embodiment (mode detection unit 401)

| Duty command value D* | Mode M (determination result) |
| --- | --- |
| D* > 1 | A1) Step-up (and CCM) |
| D* < 1 | A2) Step-down (and CCM) |

Compensator 501 adjusts duty instruction value Dc* of current controller 301 using estimation result M of operation mode detector 401.

PWM controller 601 calculates an instruction value D1* and an instruction value D2* based on adjusted duty instruction value D*. PWM controller 601 generates switching signals G10, G20 according to a result of comparison between instruction value D1* and a carrier that is a triangular wave. PWM controller 601 generates switching signals G30, G40 according to a result of comparison between instruction value D2* and the carrier that is the triangular wave.

Figure 3:
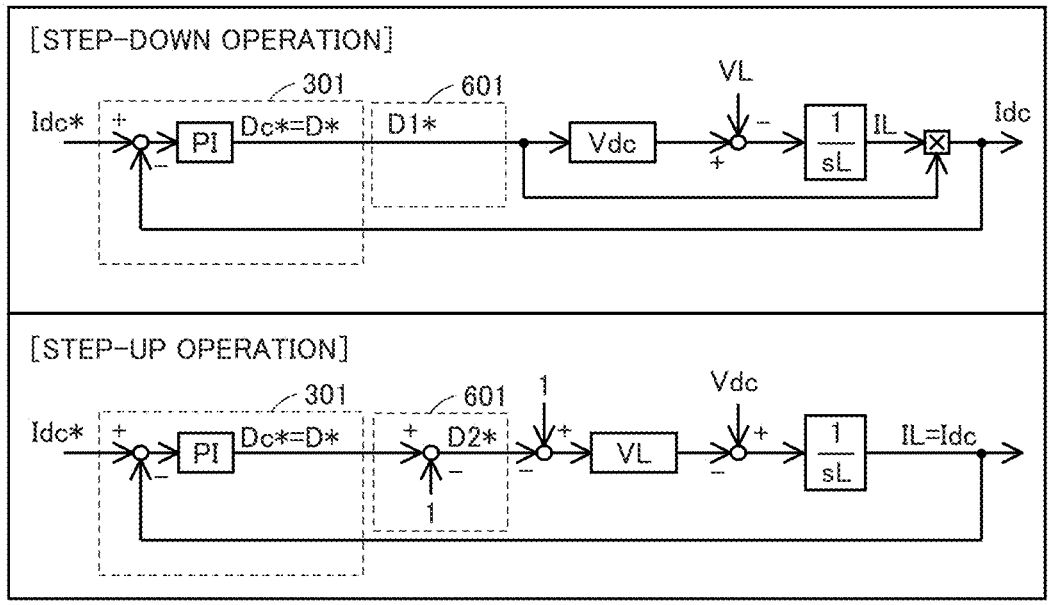
FIG. 3 is a control block diagram illustrating a power conversion device according to a study example for the first embodiment.
Figure 4:
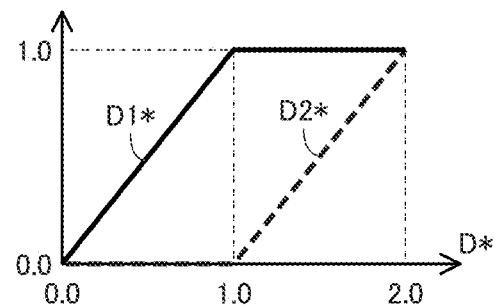
FIG. 4 is a graph illustrating a relationship between an input (D*) of a controller 601 and a converted value (D1*, D2*) thereof in the study example for the first embodiment.

FIG. 3 is a control block diagram illustrating a power conversion device according to a study example for the first embodiment. FIG. 3 illustrates a control block of the power conversion device of the study example when compensator 501 does not exist in power conversion device 100 of the first embodiment. A control block diagram during the step-down operation is illustrated on the upper side of FIG. 3, and a control block diagram during the step-up operation is illustrated on the lower side of FIG. 3. FIG. 4 is a graph illustrating a relationship between an input (D*) of controller 601 and a converted value (D1*, D2*) thereof in the study example for the first embodiment. In FIG. 4, a horizontal axis represents the value of duty instruction value D* provided to PWM controller 601, and a vertical axis represents the values of instruction value D1* and instruction value D2* generated in PWM controller 601. Duty instruction value D* is an intermediate variable required to determine instruction value D1* and instruction value D2*. PWM controller 601 and the switching circuit (non-insulating converter 201) perform the step-down operation when duty instruction value D* is in a range of 0 to 1, and perform the step-up operation when duty instruction value D* is in a range of 1 to 2.

In the step-down operation, because a product of Vdc and D1* is applied to one end of reactor 110 while VL is applied to the other end, an average voltage per carrier period of reactor L10 can be expressed by a difference between VdcD1* and VL. The average voltage is integrated into reactor L10 to generate IL. At this point, because IL is output from DC power supply 10 by a time ratio of D1*, Idc can be expressed by the product of IL and D1*.

In the set-up operation. Vdc is applied to one end of reactor L10, and the product of VL and (1−D2*) is applied to the other end. For this reason, the average voltage per carrier cycle of reactor L10 can be expressed by the difference between Vdc and VL (1−D2*). The average voltage is integrated into reactor L10 to generate IL. At this point, because Idc is matched with 1L, the relation between Idc and IL can be represented by an equal sign.

An open-loop transfer function from duty instruction value D* to current Idc in ide current control of bidirectional non-insulating convener 201 can be expressed by an equation (1) in the case of the step-down operation, and can be expressed by an equation (2) in the case of the step-up operation. "*" of D*, φ1*, φ2* in the following equations is a sign indicating the target value, and does not represent an index.

[Mathematical Formula 1]

$$Idc = \frac{D^{*2}Vdc}{sL} \quad (1)$$

[Mathematical Formula 2]

$$Idc = \frac{D^*VL}{sL} \quad (2)$$

At this point, in the case of the step-down operation, it is known that the product D*Vdc of Vdc and D* and VL are substantially matched with each other in a steady state. That is, the equation (1) represents a function equivalent to the equation (2) in the steady state. However, it can be easily guessed that the transient influence differs between the equation (1) in which the quadratic term of D* is applied and the equation (2) in which the linear term of D* is applied. Equations (3), (4) represent a minute change when Idc changes by ΔI as D* in the equations (1), (2) changes by ΔD, respectively.

[Mathematical Formula 3]

$$Idc + \Delta I = \frac{D^{*2}Vdc}{sL} + \frac{D^*Vdc}{sL}2\Delta D + \frac{Vdc}{sL}\Delta D^2 \quad (3)$$

[Mathematical Formula 4]

$$Idc + \Delta I = \frac{D^*VL}{sL} + \frac{VL}{sL}\Delta D \quad (4)$$

At this point, when the operation is performed such that D* becomes a value of 0 to 2 and when ΔD becomes a value less than or equal to 0.1 per carrier period, the function related to the quadratic term of ΔD in the equation (3) approaches 0 as close as possible when compared with other two terms on the right side and can be ignored.

When the products D*Vdc and VL of Vdc and D* are regarded as the same value, the quadratic term of ΔD0 is replaced with 0, and the equations (3), (4) are compared with each other, it is found that the term in which ΔD is applied is twice larger in the equation (3) than in the equation (4).

Figure 5:
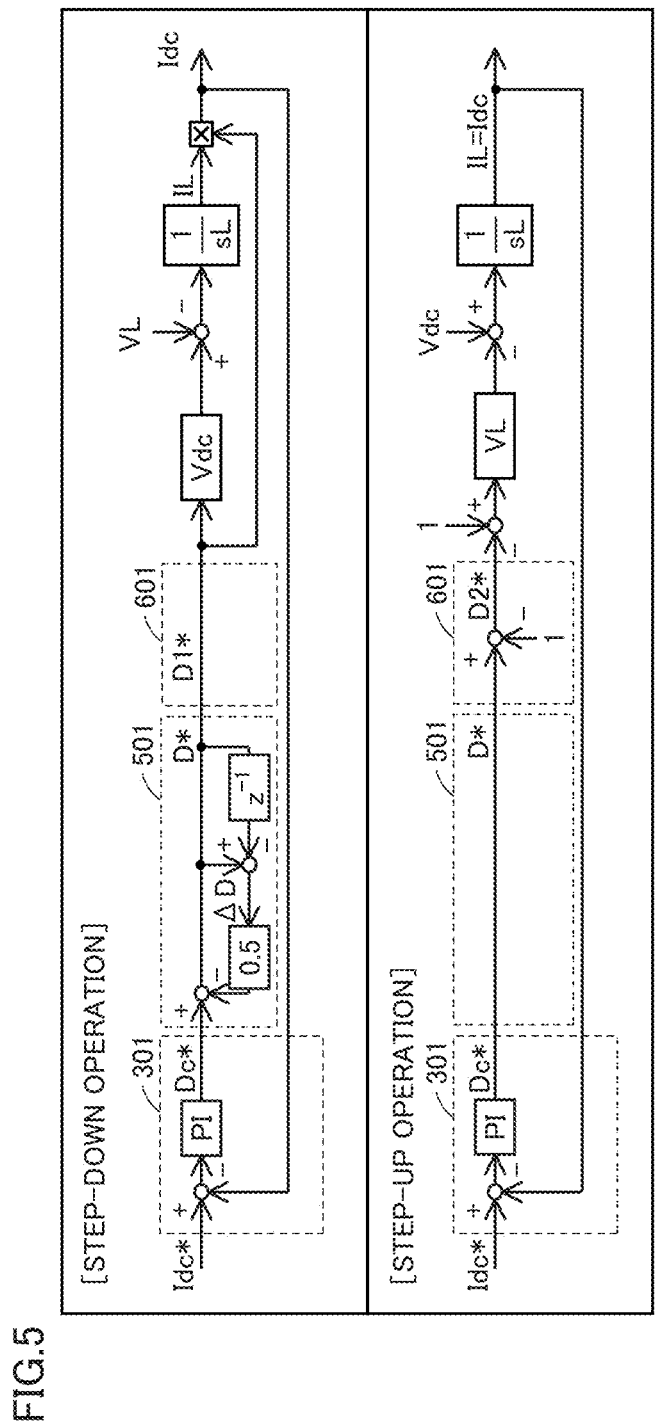
FIG. 5 is a control block diagram illustrating the power conversion device of the first embodiment.
Figure 6:
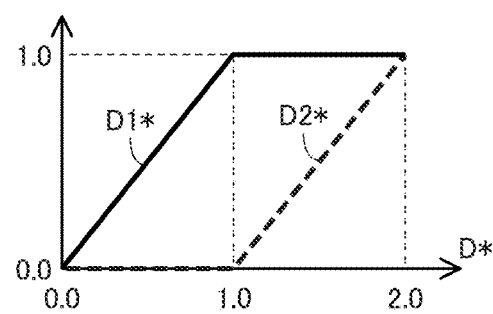
FIG. 6 is a graph illustrating the relationship between the input (D*) of the controller 601 and the converted value (D1*, D2*) thereof in the first embodiment.

FIG. 5 is a control block diagram illustrating the power conversion device of the first embodiment. FIG. 5 illustrates the control block of the power conversion device when compensator 501 exists in power conversion device 100 of the first embodiment. Similarly to FIG. 3, the upper side of FIG. 5 illustrates the control block diagram during the step-down operation, and the lower side of FIG. 5 illustrates the control block diagram during the step-up operation. Although the control block from duty instruction value D* to current Idc is different between the step-up operation and the step-down operation, it will be described later that the compensation can be performed based on the difference between the coefficients illustrated in the equations (3), (4). FIG. 6 is a graph illustrating the relationship between input (D*) of controller 601 and converted value (D1*, D2*) thereof in the first embodiment. In FIG. 6, the horizontal axis represents the value of duty instruction value D* provided to PWM controller 601, and the vertical axis represents the values of instruction value D1* and instruction value D2* generated in PWM controller 601.

Referring to FIG. 5, when the estimation result of operation mode detector 401 is the step-down operation, compensator 501 subtracts a value obtained by multiplying change amount ΔD for each arithmetic operation of duty instruction value D* by 0.5 from duty instruction value Dc* based on the difference of the linear term of ΔD in the equations (3), (4), and compensates duty instruction value D*. Thus, the linear term of ΔD in the equation (3) of the step-down operation can be made equivalent to the linear term of ΔD in the equation (4), so that a transient characteristic change can be suppressed in the current control during the switching between the step-up operation and the step-down operation. On the other hand, when the estimation result of operation mode detector 401 is the step-up operation, compensator 501 outputs Dc* as it is as D*.

Table 2 illustrates the content of the compensation processing executed by compensator 501 in the configuration of FIG. 2.

TABLE 2

Table 2
First embodiment (compensator 501)

| Mode M | D* after compensation |
|---|---|
| A1) Step-up (and CCM) | D* = Dc* |
| A2) Step-down (and CCM) | D*(n) = Dc*(n) − 0.5 × [D*(n) − D*(n − 1)] |
| | * ( ) means the nth or (n − 1)-th calculation result |

When the equations after the compensation are compared, the equations (3), (4) are partially different in the function. However, in the case of the step-down operation, the product of Vdc and D* and VL are substantially matched with each other in the steady state. Accordingly, when D* viewed from minute change amount ΔD is regarded as the steady state and replaced, the equations (3), (4) are matched with each other. "2" that is the coefficient of the linear term of ΔD in the equation (3) does not disappear, but ΔD with compensator 501 is half the change amount of ΔD without compensator 501, so that "2" and coefficient ½ of ΔD are canceled.

Figure 7:
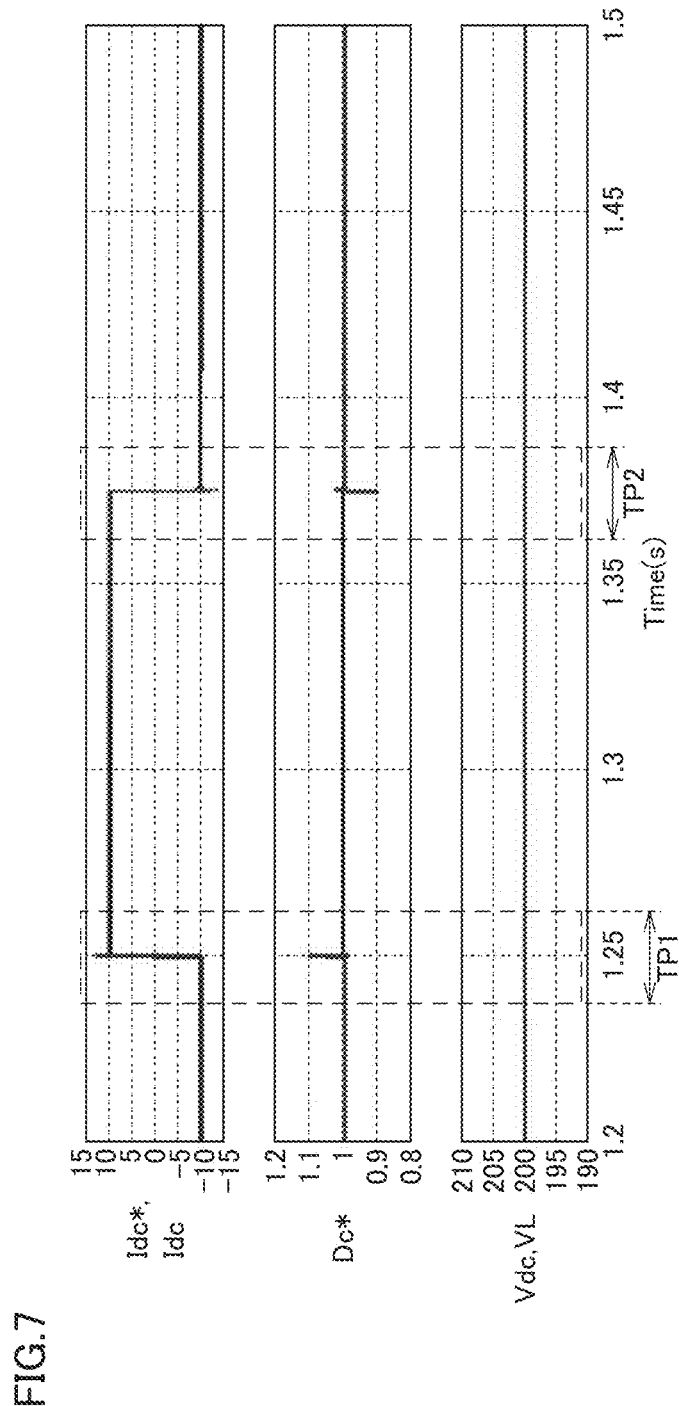
FIG. 7 is a waveform chart illustrating changes in current and voltage when a step-up operation and a step-down operation are transiently changed in the power conversion device of the first embodiment.
Figure 8:
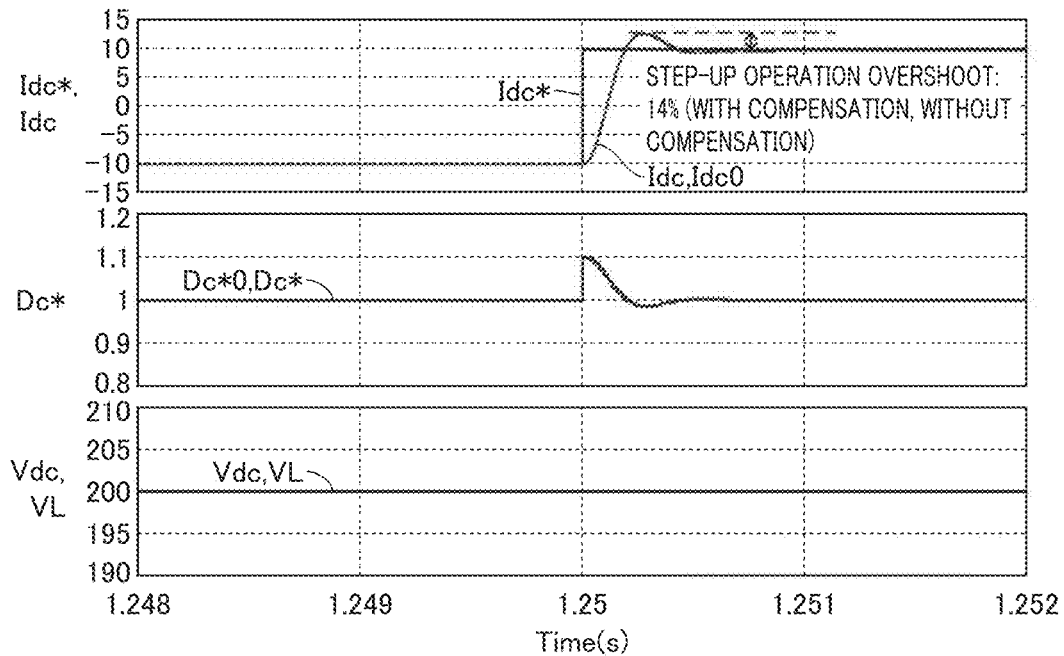
FIG. 8 is an enlarged waveform chart illustrating a period TP1 in FIG. 7.
Figure 9:
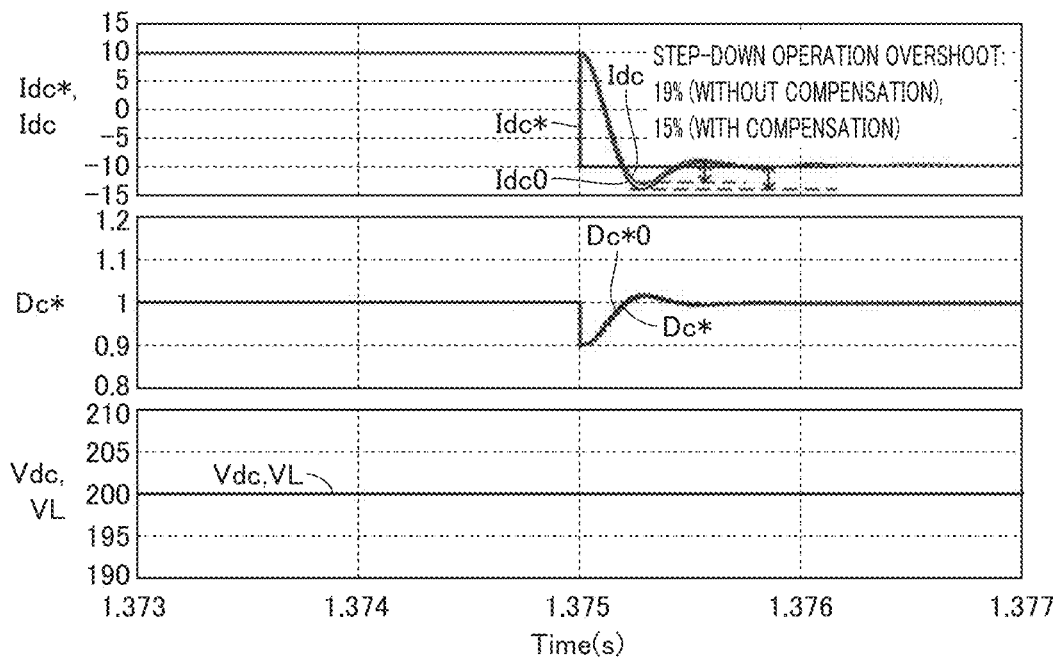
FIG. 9 is an enlarged waveform chart illustrating a period TP2 in FIG. 7.

FIG. 7 is a waveform chart illustrating changes in current and voltage when a step-up operation and a step-down operation are transiently changed in the power conversion device of the first embodiment. FIG. 8 is an enlarged waveform chart illustrating a period TP1 in FIG. 7. Period TP1 is a period before and after current instruction Idc* is increased and the step-down operation is switched to the step-up operation. FIG. 9 is an enlarged waveform chart illustrating a period TP2 in FIG. 7. Period TP2 is a period before and after current instruction Idc* is decreased and the step-up operation is switched to the step-down operation.

As illustrated in FIG. 8, a current overshoot in the case where the operation mode is switched from the step-down operation to the step-up operation is substantially equal in the case without compensator 501 (Idc0) and the case with compensator 501 (Idc), and is 14%.

On the other hand, as illustrated in FIG. 9, the current overshoot (undershoot) in the case where the operation mode is switched from the step-up operation to the step-down operation is 19% in the case without compensator 501 (Idc0), and is reduced to 15% in the case with compensator 501 (Idc).

In the configuration without compensator 501 of FIG. 3, the current overshoot was larger at the time of switching to the step-down operation than at the time of switching to the step-up operation. On the other hand, it can be seen that the configuration with compensator 501 in FIG. 5 can suppress an overshoot amount of the current at the time of switching to the step-down operation to the same extent as that at the time of switching to the step-up operation.

Modification of First Embodiment

Figure 10:
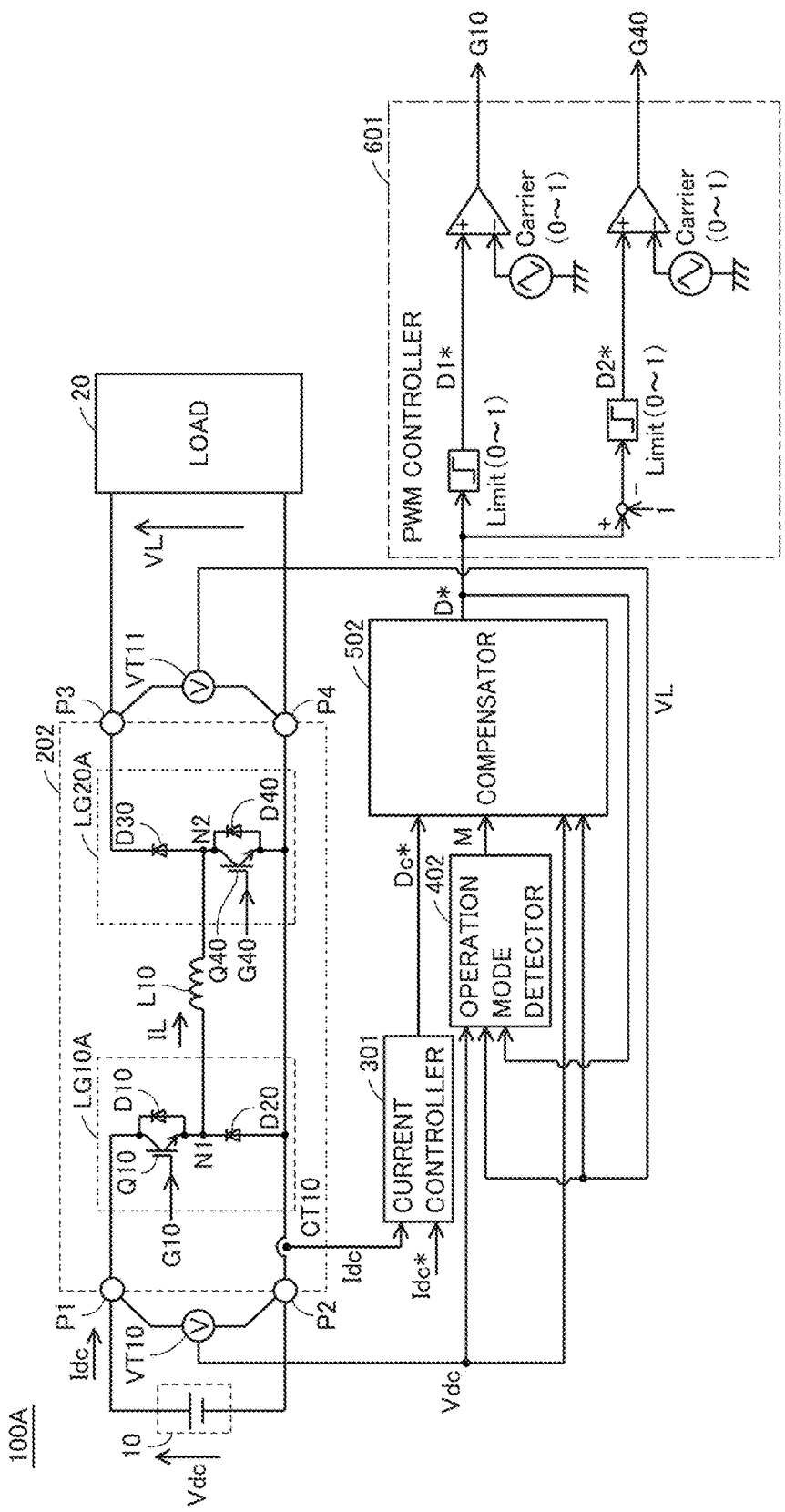
FIG. 10 is a circuit diagram illustrating details of a power conversion device 100A according to a modification of the first embodiment.

FIG. 10 is a circuit diagram illustrating details of a power conversion device 100A according to a modification of the first embodiment. Power conversion device 100A is a modification in the case where switching circuit 200 in FIG. 1 is a unidirectional non-insulating converter 202 capable of performing the step-up operation and the step-down operation but allowing the current to flow only in a single direction from DC power supply 10 toward load 20.

Unidirectional non-insulating converter 202 includes first leg LG10A, second leg LG20A, reactor L10, current sensor CT10, voltage sensor VT10, and voltage sensor VT11. Unidirectional non-insulating converter 202 operates in the step-down mode or the step-up mode.

First leg LG10A includes upper arm Q10, freewheel diode D10, and diode D20. Upper arm Q10 and diode D20 are connected in series between first terminal P1 and second terminal P2. Freewheel diode D10 is connected in antiparallel with upper arm Q10.

Second leg LG20A includes lower arm Q40, freewheel diode D40, and diode D30. Diode D30 and lower arm Q40 are connected in series between third terminal P3 and fourth terminal P4. Freewheel diode D40 is connected in antiparallel with lower arm Q40.

Reactor L10 is installed in the path connecting first connection point N1 between upper arm Q10 and diode D20 and second connection point N2 between diode D30 and lower arm Q40.

Because current sensor CT10 and voltage sensor VT10 have the same configurations as those in FIG. 2, the description thereof will not be repeated.

Figure 11:
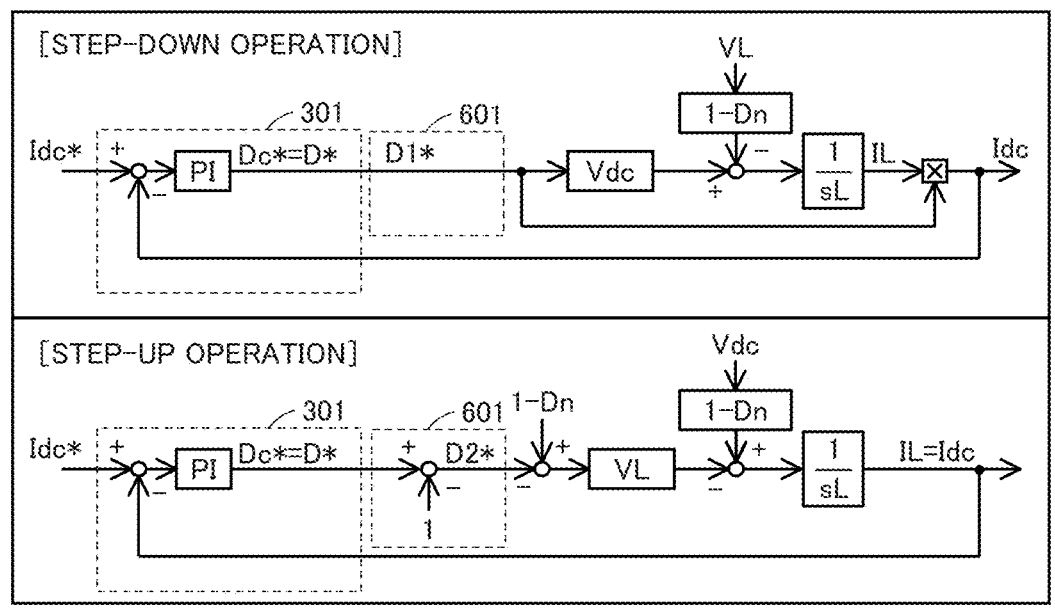
FIG. 11 is a control block diagram illustrating a power conversion device according to a study example for the modification of the first embodiment.
Figure 12:
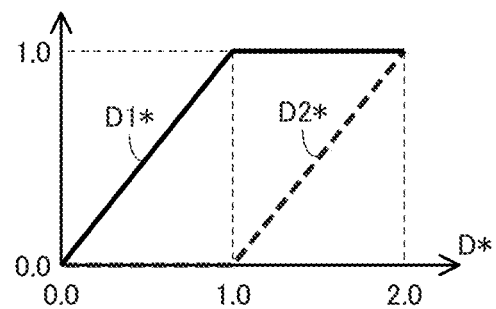
FIG. 12 is a graph illustrating the relationship between the input (D*) of the controller 601 and the converted value (D1*, D2*) thereof in the study example for the modification of the first embodiment.

FIG. 11 is a control block diagram illustrating a power conversion device according to a study example for the modification of the first embodiment. FIG. 11 illustrates the control block diagram of the power conversion device when compensator 502 of power conversion device 100A in FIG. 10 does not exist. FIG. 12 is a graph illustrating the relationship between the input (D*) of controller 601 and the converted value (D1*, D2*) thereof in the study example for the modification of the first embodiment. In FIG. 12, the horizontal axis represents the value of duty instruction value D* provided to PWM controller 601, and the vertical axis represents the values of instruction value D1* and instruction value D2* generated in PWM controller 601.

A time ratio Dn is reflected in the control block diagram of FIG. 11. At this point, the time ratio Dn is a value obtained by dividing the time when the reactor current in one carrier period becomes zero by the time of one carrier period. When the current in reactor L10 is in a current continuous mode (Dn=0), the control block diagram in FIG. 11 is the same as the control block diagram in FIG. 3. On the other hand, in the case of a current discontinuous mode (Dn>0), the control block diagram in FIG. 11 is different from the control block diagram in FIG. 3 in the characteristic of the current control system.

Figure 13:
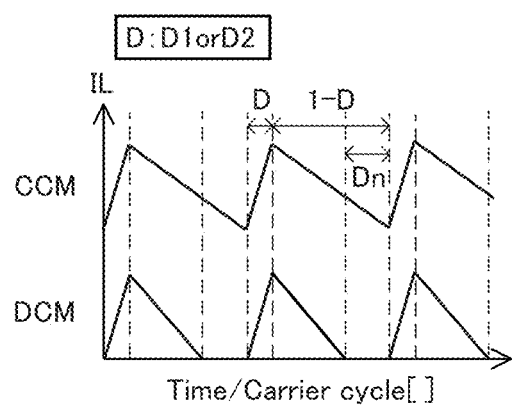
FIG. 13 is a view illustrating a difference between a current continuous mode and a current discontinuous mode.

FIG. 13 is a view illustrating a difference between the current continuous mode and the current discontinuous mode. "CCM" in FIG. 13 represents the continuous current mode, and "DCM" represents the discontinuous current mode. In the current continuous mode, there is no period during which the reactor current becomes zero, and analysis is easy. On the other hand, in the current discontinuous mode, there is a period during which the reactor current becomes zero, and analysis is difficult.

The open-loop transfer function in the Idc current control of unidirectional non-insulating converter 202 can be expressed similarly to the equation (1) in the case of the step-down operation, and can be expressed similarly to the equation (2) in the case of the step-up operation. Consequently, even when unidirectional non-insulating converter 202 is used, a change in the characteristic of the current control system can be suppressed by performing compensation similar to that of bidirectional non-insulating converter 201.

The case where the function related to time ratio Dn is analyzed so as to be regarded as the gain generated in series to the open-loop path of the Idc current control instead of the disturbance term will be considered as an evolution type.

Operation mode detector 401 in FIG. 2 detects a total of two modes of "A1: step-up mode" and "A2: step-down mode". On the other hand, operation mode detector 402 in FIG. 10 detects a mode change of a total of four modes of "B1: the step-up mode and the current continuous mode", "B2: the step-up mode and the current discontinuous mode", "B3: the step-down mode and the current continuous mode", and "B4: the step-down mode and the current discontinuous mode" using the detection values of the voltage sensors VT10, VT11 and the like. At this point, compensator 502 compensates the difference in gain according to the analysis result of the four modes.

The above four modes can be associated with the detection value of the voltage sensor as follows. The mode of the current generated in reactor L10 is only the CCM because the upper and lower elements of first leg LG10 are mutually turned on and off and the upper and lower elements of second leg LG20 are mutually turned on and off in the configuration of FIG. 1.

On the other hand, in the configuration of FIG. 10, only the element of the upper arm is turned on and off in first leg LG10A, and only the element of the lower arm is turned on and off in second leg LG20A. For this reason, sometimes the mode of the current generated in reactor L10 is the CCM or the DCM. The CCM can be expressed by duty instruction value D* and input and output voltages Vdc, VL, and the DCM requires a time ratio Dn of a zero current period in a triangular wave period in addition to the above three items. In the configuration of FIG. 10, whether the mode of the current generated in reactor L10 is the CCM or the DCM can be estimated from duty instruction value D* and input and output voltages Vdc, VL. In the configuration of FIG. 10, Table 3 illustrates the operation mode detected by operation mode detector 402.

TABLE 3

Table 3
Modification of first embodiment (mode detection unit 402)

| Duty command value D* | Relationship established among Vdc, VL, and D* | Mode M (determination result) |
|---|---|---|
| D* > 1 | (1 − D*) = 1 − Vdc/VL | B1) Step-up and CCM |
| D* > 1 | (1 − D*)/(1 − Dn) = 1 − Vdc/VL | B2) Step-up and DCM |
| D* < 1 | D* = VL/Vdc | B3) Step-down and CCM |
| D* < 1 | D*/(1 − Dn) = VL/Vdc | B4) Step-down and DCM |

As illustrated in Table 3, operation mode detector 402 determines whether the operation mode is the step-up operation or the step-down-operation depending on whether duty instruction value D* is larger or smaller than 1, and determine whether a mode M is one of modes B1 to B4 depending on which equation is close to the relationship established among Vdc, VL, and D*.

Table 4 illustrates the content of the compensation processing executed by compensator 502 in the configuration of FIG. 10.

TABLE 4

Table 4
Modification of first embodiment (compensator 502)

| Mode M | D* after compensation |
|---|---|
| B1) Step-up and CCM | D* = Dc* |
| B2) Step-up and DCM | D* = Dc* − Dn |
| B3) Step-down and CCM | D*(n) = Dc*(n) − 0.5 × [D*(n) − D*(n − 1)] * ( ) means the nth or (n − 1)-th operation result |
| B4) Step-down and DCM | D*(n) = Dc*(n) − 0.5 × [D*(n) − D*(n − 1)] * ( ) means the nth or (n − 1)-th operation result |

Theoretical values of time ratio Dn during the step-down shown in Tables 3, 4 can be calculated as follows.

$$D1*/(1-Dn)=D*/(1-Dn)=VL/Vdc$$

$$\rightarrow Dn=1-D*Vdc/VL$$

Similarly, theoretical values of time ratio Dn during the step-up illustrated in Tables 3, 4 can be calculated as follows.

$$D2*/(1-Dn)=(1-D*)/(1-Dn)=1-Vdc/VL$$

$$\rightarrow Dn=1-(1-D*)/(1-Vdc/VL)$$

That is, time ratio Dn can be estimated from the detection values of voltages Vdc, VL and duty instruction value D*. When an estimated value of time ratio Dn is used in the control, the response speed of the current control system related to the change amount of duty instruction value D* needs to be slower than convergence of the estimated value of time ratio Dn. This is because when duty instruction value D* changes largely before time ratio Dn converges, time ratio Dn also changes largely as in the above equation, and the compensation of the current control system does not hold.

When the detection target of voltage sensor VT10 is a constant voltage source, a predetermined fixed value may be set to each of operation mode detector 402 and compensator 502 with no use of voltage Vdc that is the detection value of voltage sensor VT10. Similarly, when the detection target of voltage sensor VT11 is the constant voltage source, a predetermined fixed value may be set to each of operation mode detector 402 and compensator 502 with no use of voltage VL that is the detection value of voltage sensor VT11.

Figure 14:
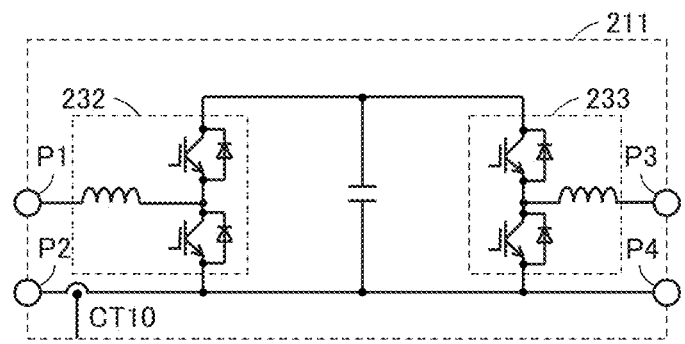
FIG. 14 is a circuit diagram illustrating a configuration of a bidirectional non-insulating converter 211 that is of a first configuration example.
Figure 15:
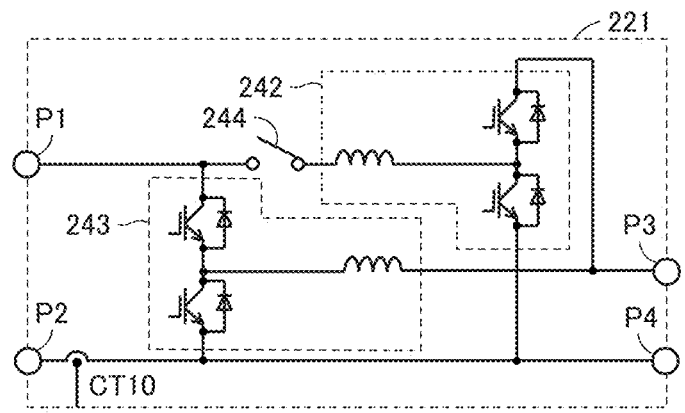
FIG. 15 is a circuit diagram illustrating a configuration of a bidirectional non-insulating converter 221 that is of a second configuration example.

At this point, bidirectional non-insulating converter 211, 221 that are a similar configuration example of bidirectional non-insulating converter 201 in FIG. 2 will be described. FIG. 14 is a circuit diagram illustrating a configuration of a bidirectional non-insulating converter 211 that is of a first configuration example. FIG. 15 is a circuit diagram illustrating a configuration of a bidirectional non-insulating converter 221 that is of a second configuration example.

Bidirectional non-insulating converter 201 in FIG. 2 includes a step-down converter including first leg LG10 and reactor L10 on the connection end side of first terminal P1 and second terminal P2 and a step-up converter including reactor L10 and second leg LG20 on the connection end side of third terminal P3 and fourth terminal P4.

On the other hand, bidirectional non-insulating converter 211 in FIG. 14 includes a step-up converter 232 on the connection end side of first terminal P1 and second terminal P2, a step-down converter 233 on the connection end side of third terminal P3 and fourth terminal P4, and a smoothing capacitor between step-up converter 232 and step-down converter 233. Furthermore, bidirectional non-insulating converter 221 in FIG. 15 has a parallel configuration in which a step-up converter 242 and a step-down converter 243 can be switched by a switch 244.

When bidirectional non-insulating converter 201 is replaced with bidirectional non-insulating converter 211 or 221, the step-up mode and the step-down mode can be separately operated in the same manner. Accordingly, even when bidirectional non-insulating converter 201 is replaced with bidirectional non-insulating converter 211 or 221, these can be used similarly to bidirectional non-insulating converter 201.

However, switch 244 of bidirectional non-insulating converter 221 needs to set the switching condition as follows. For example, similarly to bidirectional non-insulating converter 201, step-up converter 242 and step-down converter 243 may be switched according to duty instruction value D*. Alternatively, the step-up converter 242 and the step-down converter 243 may be switched according to the magnitude relationship between the input voltage Vdc and the output voltage VL.

When switch 244 is switched in the case of the large current of the path connected in series with switch 244, an arc is generated when the switch is opened, which causes a failure such as welding of the switch. Accordingly, in addition to the above switching condition, that the current of the reactor connected in series with switch 244, the detection value of current sensor CT10 that is the target of the current control, or the target value of the current control is less than or equal a certain value may be used as an AND condition of the switch switching condition.

As described above, the non-insulating converter in FIG. 2 and the non-insulating converter in FIG. 10 that is a modification are exemplified in the first embodiment. In these converters, at least one of switching between the current continuous mode and the current discontinuous mode and switching between the step-up operation and the step-down operation is generated. In the first embodiment, it has been described that the change generated in the characteristic of the current control system that adjusts the current of the switching circuit can be mitigated during the generation of the switching.

Second Embodiment

Figure 16:
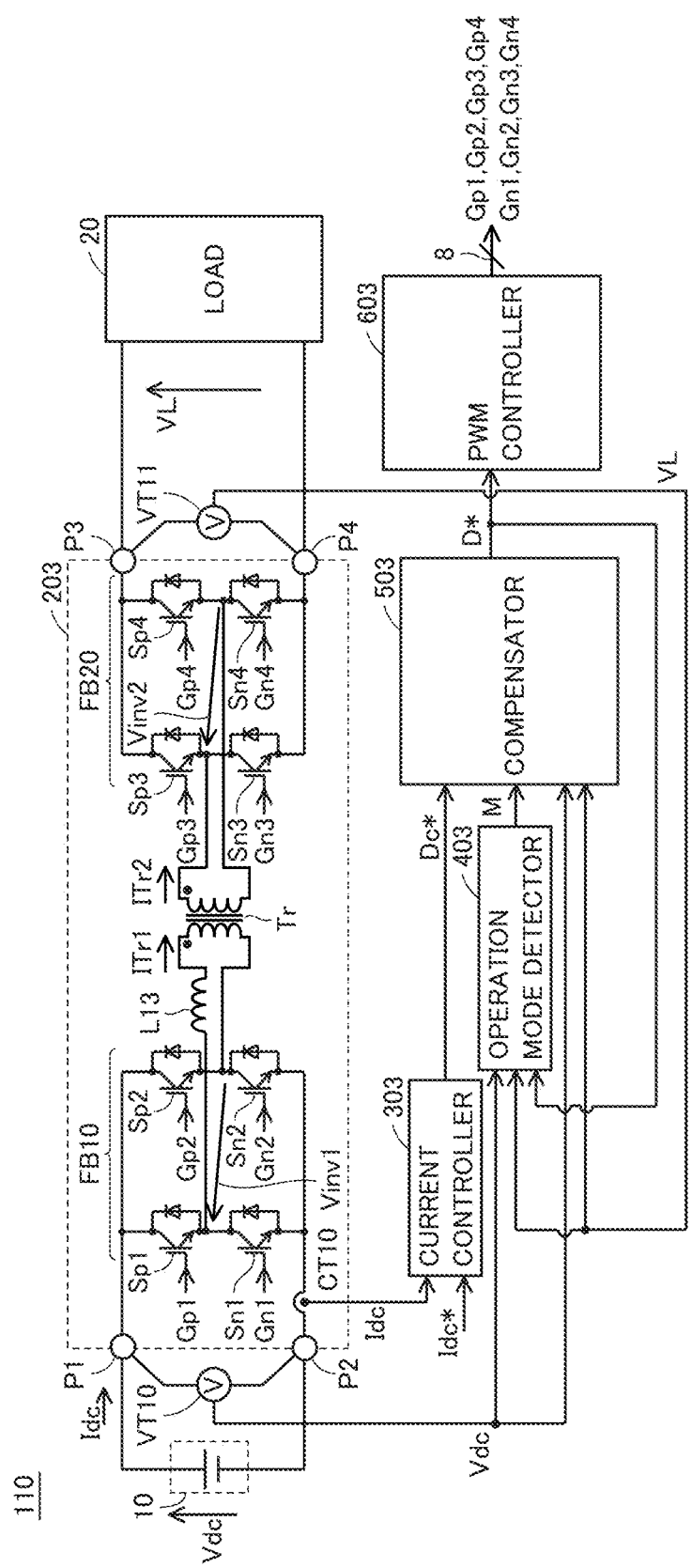
FIG. 16 is a circuit diagram illustrating details of a power conversion device 110 according to a second embodiment.

FIG. 16 is a circuit diagram illustrating details of a power conversion device 110 according to a second embodiment. FIG. 16 illustrates a configuration when a bidirectional insulating converter 203, which can perform the step-up operation and the step-down operation, charge DC power supply 10, and discharge from DC power supply 10, is used as switching circuit 200 in FIG. 1.

Bidirectional insulating converter 203 includes a first bridge FB10, a second bridge FB20, a reactor L13, a transformer Tr, current sensor CT10, voltage sensor VT10, and voltage sensor VT11. Bidirectional insulating converter 203 operates in a discharge mode in which DC power supply 10 discharges power or a charge mode in which DC power supply 10 is charged.

First bridge FB10 includes upper arms Sp1, Sp2 and lower arms Sn1, Sn2. Upper arm Sp1 and lower arm Sn1 are connected in series between first terminal P1 and second terminal P2. Upper arm Sp2 and lower arm Sn2 are connected in series between first terminal P1 and second terminal P2. The freewheel diode is connected in antiparallel to each of arms Sp1, Sp2, Sn1, Sn2.

Second bridge FB20 includes upper arms Sp3, Sp4 and lower arms Sn3, Sn4. Upper arm Sp3 and lower arm Sn3 are connected in series between third terminal P3 and fourth terminal P4. Upper arm Sp4 and lower arm Sn4 are connected in series between third terminal P3 and fourth terminal P4. The freewheel diode is connected in antiparallel to each of arms Sp3, Sp4, Sn3, Sn4.

Reactor L13 is connected between a first connection point between upper arm Sp1 and lower arm Sn1 and one end of the path on the primary side of transformer Tr. The other end of the path on the primary side of transformer Tr is connected to a second connection point between upper arm Sp2 and lower arm Sn2.

One end of the path on the secondary side of transformer Tr is connected to a third connection point between upper arm Sp3 and lower arm Sn3. The other end of the path on the secondary side of transformer Tr is connected to a fourth connection point between upper arm Sp4 and lower arm Sn4.

Current sensor CT10 detects current Idc flowing from second terminal P2 into first bridge FB10. The current flowing from first bridge FB10 to first terminal P1 may be detected instead of the current flowing from second terminal P2 to first bridge FB10.

Voltage sensor VT10 detects a potential difference Vdc between first terminal P1 and second terminal P2. Voltage sensor VT11 detects a potential difference VL between third terminal P3 and fourth terminal P4.

When bidirectional insulating converter 203 operates in the discharge mode, upper arms Sp1, Sp2, Sp4 and lower arms Sn1, Sn2, Sn4 are subjected to the switching control, and upper arm Sp3 and lower arm Sn3 are not conducted. At this point, the switching control is performed such that upper arm Sp1 and lower arm Sn1 are alternately conducted, such that upper arm Sp2 and lower arm Sn2 are alternately conducted, and such that upper arm Sp4 and lower arm Sn4 are alternately conducted.

When bidirectional insulating converter 203 operates in the charge mode, upper arms Sp2, Sp3, Sp4 and lower arms Sn2, Sn3, Sn4 are subjected to the switching control, and upper arm Sp1 and lower arm Sn1 are not conducted. At this point, the switching control is performed such that upper arm Sp2 and lower arm Sn2 are alternately conducted, such upper arm Sp3 and lower arm Sn3 are alternately conducted, and such that upper arm Sp4 and lower arm Sn4 are alternately conducted.

For example, a self-arc-extinguishing semiconductor switching element typified by an IGBT or a MOSFET can be used as upper arms Sp1, Sp2, Sp3, Sp4 and lower arms Sn1, Sn2, Sn3, SM. When MOSFETs are used as upper arms Sp1, Sp2, Sp3, Sp4 and lower arms Sn1, Sn2, Sn3, Sn4, the parasitic diode of the MOSFET may be used instead of the freewheel diode.

Switching signals Gp1, Gp2, Gp3, Gp4 and Gn1, Gn2, Gn3, Gn4 turning on and off upper arms Sp1, Sp2, Sp3. Sp4 and lower arms Sn1, Sn2, Sn3, Sn4 are generated through current controller 303, operation mode detector 403, compensator 503, and PWM controller 603.

Current controller 303 adjusts duty instruction value Dc* such that the detection value of current sensor CT10 that measures current ide approaches target value Idc*. In order to suppress a switching ripple component of current Idc, average value processing may be performed on the detection value of current sensor CT10 for each carrier period, or a low pass filter (LPF) may be provided in the path connecting current sensor CT10 and current controller 303.

Operation mode detector 403 estimates in which operation mode bidirectional insulating converter 203 is operating based on duty instruction value D* of PWM controller 603 and the detection values of voltage sensors VT10, VT20, and outputs an estimation result. Operation mode M can take eight states of C1: current state 1 in the discharge mode, C2: current state 2 in the discharge mode, C3: current state 3 in the discharge mode, C4: current state 4 in the discharge mode, C5: current state 1 in the charge mode. C6: current state 2 in the charge mode, C7: current state 3 in the charge mode, and C8: current state 4 in the charge mode. In this case, each of the charge mode and the discharge mode is classified into four lower classifications of a current state 1, a current state 2, a current state 3, and a current state 4, but details will be described later. In the configuration of FIG. 16, Table 5 illustrates the operation mode detected by operation mode detector 403. Details of the content in Table 5 will be described later.

TABLE 5

Table 5
Second embodiment (mode detection unit 403)

| Duty command value D* | Relationship established among Vdc, VL, and D* | Mode M (determination result) |
|---|---|---|
| Positive (0 to 0.25) | Vdc/VL < 1 | C1) Discharge and current state 1 |
| Positive (0 to 0.25) | Make determination by Vdc/VL ≥ 1 and boundary expressions of equations (14), (15) | C2) Discharge and current state 2 |
| Positive (0 to 0.25) | Not applicable | C3) Discharge and current state 3 |
| Positive (0 to 0.25) | Make determination by Vdc/VL ≥ 1 and boundary expressions of equations (14), (15) | C4) Discharge and current state 4 |
| Negative (−0.25 to 0) | VL/Vdc < 1 | C5) Charge and current state 1 |
| Negative (−0.25 to 0) | Make determination by VL/Vdc ≥ 1 and boundary expressions of equations (17), (18) | C6) Charge and current state 2 |
| Negative (−0.25 to 0) | Not applicable | C7) Charge and current state 3 |
| Negative (−0.25 to 0) | Make determination by VL/Vdc ≥ 1 and boundary expressions of equations (17), (18) | C8) Charge and current state 4 |
| Positive (greater than or equal to 0.25) | Make determination by boundary expressions of equations (19), (20) | C1) Discharge and current state 1 |
| Positive (greater than or equal to 0.25) | Make determination by boundary expressions of equations (19), (20) and boundary expressions of equations (20), (21) | C2) Discharge and current state 2 |
| Positive (greater than or equal to 0.25) | Make determination by boundary expressions of equations (20), (21) and boundary expressions of equations (21), (22) | C3) Discharge and current state 3 |
| Positive (greater than or equal to 0.25) | Make determination by boundary expressions of equations (21), (22) | C4) Discharge and current state 4 |
| Negative (less than or equal to −0.25) | Make determination by boundary expressions of equations (23), (24) | C5) Charge and current state 1 |
| Negative (less than or equal to −0.25) | Make determination by boundary expressions of equations (23), (24) and boundary expressions of equations (24), (25) | C6) Charge and current state 2 |
| Negative (less than or equal to −0.25) | Make determination by boundary expressions of equations (24), (25) and boundary expressions of equations (25), (26) | C7) Charge and current state 3 |
| Negative (less than or equal to −0.25) | Make determination by boundary expressions of equations (25), (26) | C8) Charge and current state 4 |

When the detection target of voltage sensor VT10 is a constant voltage source, a predetermined fixed value may be set to each of operation mode detector 403 and compensator 503 with no use of voltage Vdc that is of the detection value. Similarly, when the detection target of voltage sensor VT20 is a constant voltage source, a predetermined fixed value may be set to each of operation mode detector 403 and compensator 503 with no use of voltage VL that is of the detection value.

Compensator 503 adjusts duty instruction value DC* of current controller 303 using a function corresponding to the operation mode based on estimation result M of operation mode detector 403, and generates duty instruction value D*. Compensator 503 may adjust the gain of the current control system including current controller 303. Table 6 illustrates the content of the compensation processing executed by compensator 503 when the gain adjustment is performed. Details of the content in Table 6 will be described later.

TABLE 6

Table 6
Second embodiment (compensator 503)

| Mode M | Duty command value D* | Gain G1 |
|---|---|---|
| C1) Discharge and current state 1 | −0.25 < D* < 0.25 | Coefficient of equation (27) (=0) |
|  | D* ≤ −0.25 or D ≥ 0.25 | Coefficients of equation (33) |
| C2) Discharge and current state 2 | −0.25 < D* < 0.25 | Coefficients of equation (28) |
|  | D* ≤ −0.25 or D* ≥ 0.25 | Coefficients of equation (34) |
| C3) Discharge and current state 3 | −0.25 < D* < 0.25 | Not Applicable |
|  | D* ≤ −0.25 or D* ≥ 0.25 | Coefficients of equation (35) |
| C4) Discharge and current state 4 | −0.25 < D* < 0.25 | Coefficients of equation (29) |
|  | D* ≤ −0.25 or D* ≥ 0.25 | Coefficients of equation (36) |
| C5) Charge and current state | −0.25 < D* < 0.25 | Coefficient of equation (30) (=0) |
|  | D* ≤ −0.25 or D* ≥ 0.25 | Coefficients of equation (37) |
| C6) Charge and current state | −0.25 < D* < 0.25 | Coefficients of equation (31) |
|  | D* ≤ −0.25 or D* ≥ 0.25 | Coefficients of equation (38) |
| C7) Charge and current state | −0.25 < D* < 0.25 | Not applicable |
|  | D* ≤ −0.25 or D* ≥ 0.25 | Coefficients of equation (39) |
| C8) Charge and current state 4 | −0.25 < D* < 0.2 5 | Coefficients of equation (32) |
|  | D* ≤ −0.25 or D* ≥ 0.25 | Coefficients of equation (40) |

PWM controller 603 converts duty instruction value D* into phase shift amounts φ1*, φ2*, and generates an on and off signal having an on and off ratio of 50%. The on and off ratio is not limited to 50%, but may be another fixed ratio.

First, the processing of PWM controller 603 in the charge mode and the discharge mode will be described using a first bridge voltage Vinv1, a second bridge voltage Vinv2, current Itr of transformer Tr, and current Idc on the side of DC power supply 10.

Figure 17:
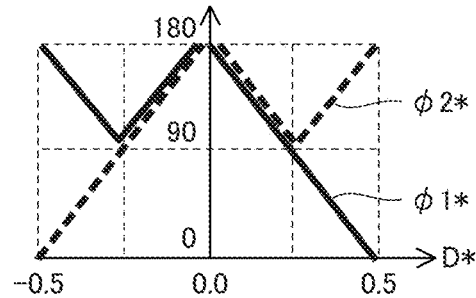
FIG. 17 is a characteristic diagram illustrating a relationship in which a PWM controller 603 converts a phase shift amounts φ1* and φ2* from a duty instruction value D*.
Figure 18:
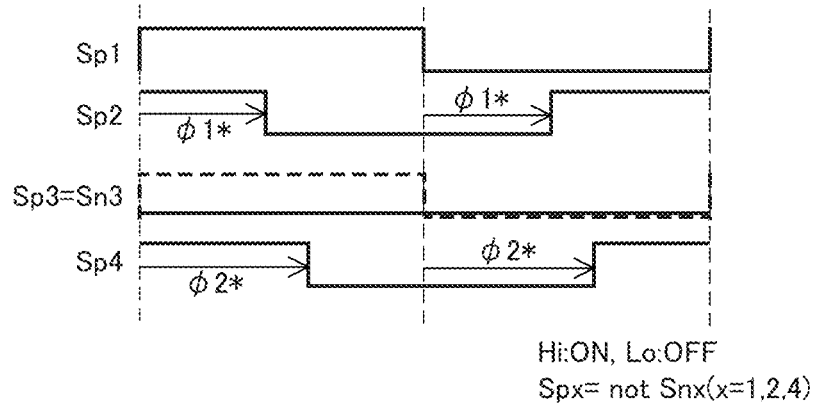
FIG. 18 is a waveform diagram illustrating an on and off state and a phase shift amount of each arm in a discharge mode.
Figure 19:
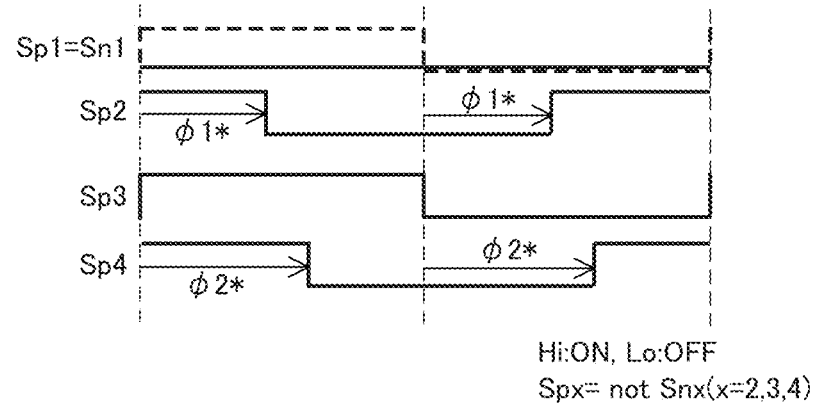
FIG. 19 is a waveform diagram illustrating the on and off state and the phase shift amount of each arm in a charge mode.

FIG. 17 is a characteristic diagram illustrating the relationship in which PWM controller 603 converts phase shift amounts φ1*, φ2* from duty instruction value D*. FIG. 18 is a waveform diagram illustrating the on and off state and the phase shift amount of each arm in the discharge mode. FIG. 19 is a waveform diagram illustrating the on and off state and the phase shift amount of each arm in the charge mode.

As illustrated in FIGS. 18 and 19, phase shift amount φ1* is an instruction value shifting the on and off signal of the on and off ratio of 50% added to arm Sp2 from a reference timing. Phase shift amount φ2* is an instruction value shifting the on and off signal of the on and off ratio of 50% added to arm Sp4 from the reference timing.

In FIG. 17, in the region where duty instruction value D* is −0.25 to 0.25, phase shift amounts φ1* and φ2* change at the same value. In the region where duty instruction value D* is less than or equal to −0.25, or greater than or equal to 0.25, phase shift amount φ2* increases depending on the increase in duty instruction value D*, and phase shift amount φ1* decreases depending on the increase in duty instruction value D*. In the following description, an area where duty instruction value D* is −0.25 to 0.25 is referred to as a "loss reduction area", and an area where duty instruction value D* is less than or equal to −0.25 or greater than or equal to 0.25 is referred to as a "high output area".

Operation waveforms of the discharge mode and the charge mode are affected by phase shift amounts φ1*, φ2* in FIG. 17 and the difference in the signal generation methods of upper arms Sp1, Sp2, Sp3, Sp4 and lower arms Sn1, Sn2, Sn3, Sn4. According to the shapes of first bridge voltage Vinv1, second bridge voltage Vinv2, and current Itr of transformer Tr, each of the operation waveforms of the discharge mode and the charge mode can be classified into four lower levels of current state 1, current state 2, current state 3, and current state 4. FIGS. 20 to 27 illustrate waveform examples of the current states in the discharge mode and the charge mode. In the following description, for the sake of explanation and simplification of a mathematical formula, a turn ratio of transformer Tr is 1 to 1, and the notation of the mathematical formula of reactor L13 is Ls. However, even in a configuration in which the number of turns of transformer Tr is different, a similar effect can be obtained by performing general turn ratio conversion.

As a result of applying phase shift amounts φ1*, φ2* in FIGS. 18 and 19 to the on and off signal having the on and off ratio of 50%, first bridge voltage Vinv1 and second bridge voltage Vinv2 are generated.

Figure 20:
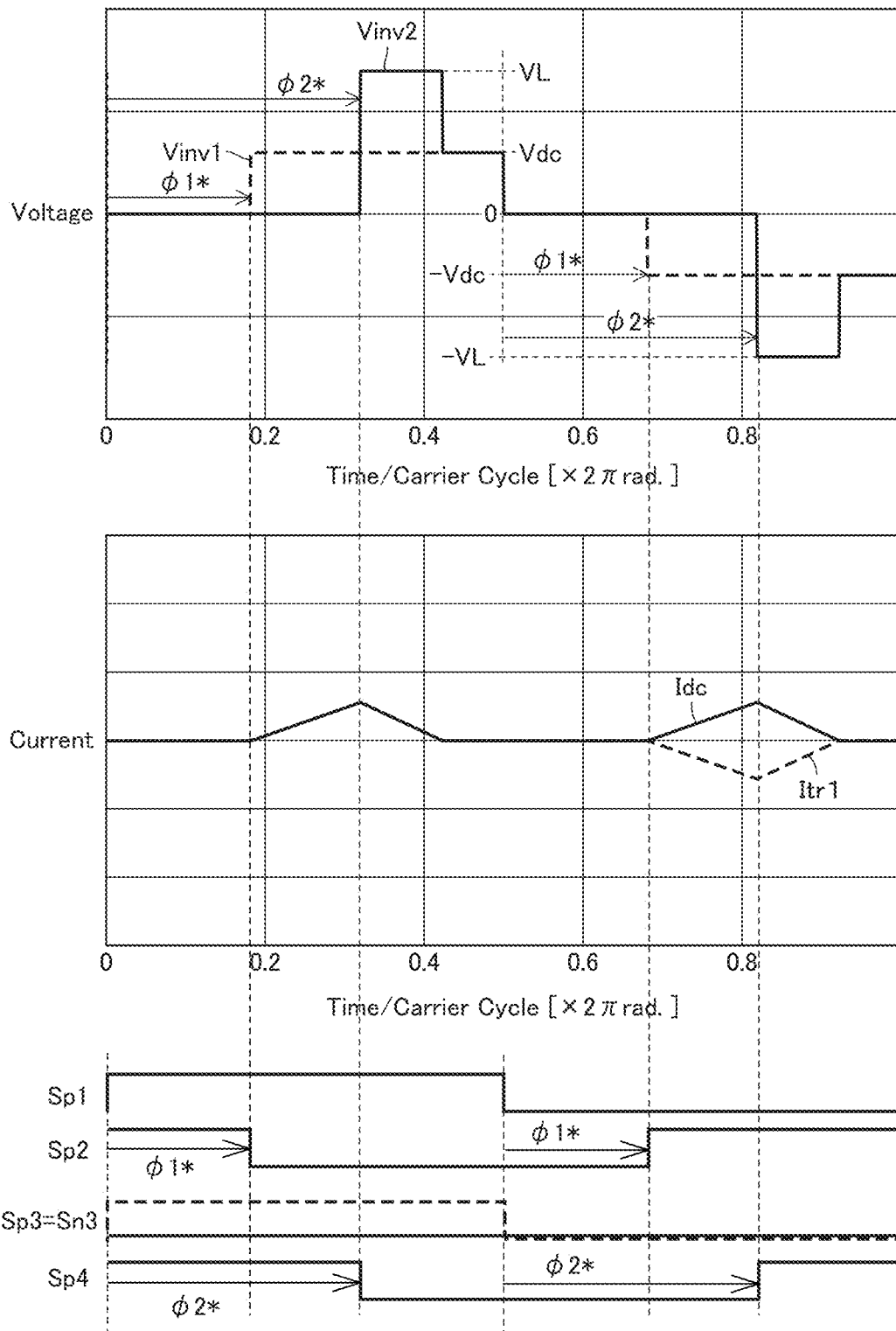
FIG. 20 is a waveform chart illustrating an example of a current state 1 in the discharge mode.

FIG. 20 is a waveform chart illustrating an example of current state 1 in the discharge mode. In the following description, "level" means the number of stages of voltage change of each of Vinv1 and Vinv2. For example, in the voltage waveform in FIG. 20, Vinv1 changes to three levels of Vdc, 0, −Vdc. Vinv2 changes in five levels of VL, transformer transformation ratio×Vdc, 0, transformer transformation ratio×(−Vdc), and −VL. In order to simplify the description, a transformer transformation ratio is 1:1 in FIG. 20 and subsequent drawings.

FIG. 20 will be described as a representative. First bridge voltage Vinv1 becomes 0 in the period in which both arm Sp1 and arm Sp2 are turned on (from 0 to the φ1* elapsed time point). In addition, first bridge voltage Vinv1 becomes Vdc in the period (from the φ1* elapsed time point to the time point of 50% of the cycle) in which arm Sp1 is turned on and arm Sp2 is turned off. In addition, first bridge voltage Vinv1 becomes −Vdc in the period (from the time point of 50% of the cycle to the time point of 100% of the cycle after the φ1 elapsed time point) in which arm Sp1 is turned off and arm Sp2 is turned on.

Second bridge voltage Vinv2 becomes VL because the energy of the transformer is received when Sp4 is turned off and when first bridge voltage Vinv1 is a positive voltage (from the φ2* elapsed time point). At this point, when the energy received from the transformer is disappeared, second bridge voltage Vinv2 becomes the same value (Vdc) as first bridge voltage Vinv1. In addition, second bridge voltage Vinv2 becomes −VL because the energy of the transformer is received when arm Sp4 is turned on and when first bridge voltage Vinv1 is a negative voltage (from the φ2* elapsed time point from the time point of 50% of the cycle). Similarly, when the energy received from the transformer is disappeared, second bridge voltage Vinv2 becomes the same value (−Vdc) as first bridge voltage Vinv1.

Figure 21:
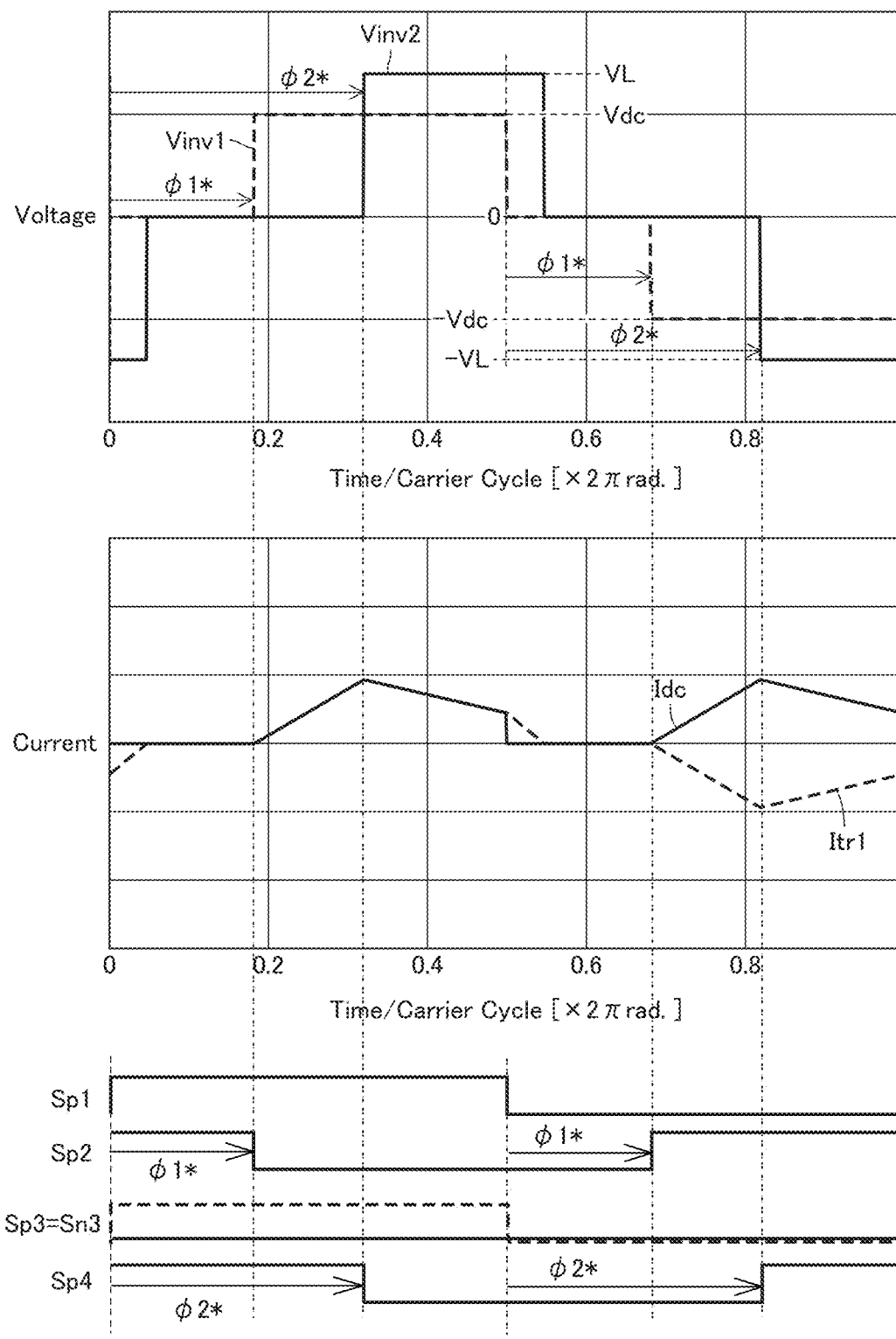
FIG. 21 is a waveform chart illustrating an example of a current state 2 in the discharge mode.

The concept of the above description also applies to the waveforms in FIG. 21 and subsequent drawings.

In current state 1 in the discharge mode of FIG. 20, first bridge voltage Vinv1 changes to 3 levels, second bridge voltage Vinv2 changes to 5 levels, and the period in which the current becomes 0 exists in current Itr of transformer Tr.

In current state 1 in the discharge mode of FIG. 20, the average value of current Idc for each carrier period Tc can be expressed by an equation (5) when current Idc is averaged, integrated, and arranged for each period in which Idc changes.

[Mathematical Formula 5]

$$Idc = \frac{VdcTc}{Ls} \frac{VL}{VL - Vdc} \left( \frac{\phi 2^* - \phi 1^*}{2\pi} \right)^2 \quad (5)$$

FIG. 21 is a waveform chart illustrating an example of current state 2 in the discharge mode. In current state 2 in the discharge mode of FIG. 21, first bridge voltage Vinv1 changes to 3 levels, second bridge voltage Vinv2 changes to 3 levels, and the period in which the current becomes 0 exists in current Itr of transformer Tr.

In current state 2 in the discharge mode of FIG. 21, the average value of current Idc for each carrier period Tc can be expressed by an equation (6) when current Idc is averaged, integrated, and arranged for each period in which Idc changes.

[Mathematical Formula 6]

Mathematical Formula 6

$$Idc = \frac{Tc}{Ls} \left\{ Vdc \left( \frac{\pi - \phi 1^*}{2\pi} \right)^2 - VL \left( \frac{\pi - \phi 2^*}{2\pi} \right)^2 \right\} \quad (6)$$

Figure 22:
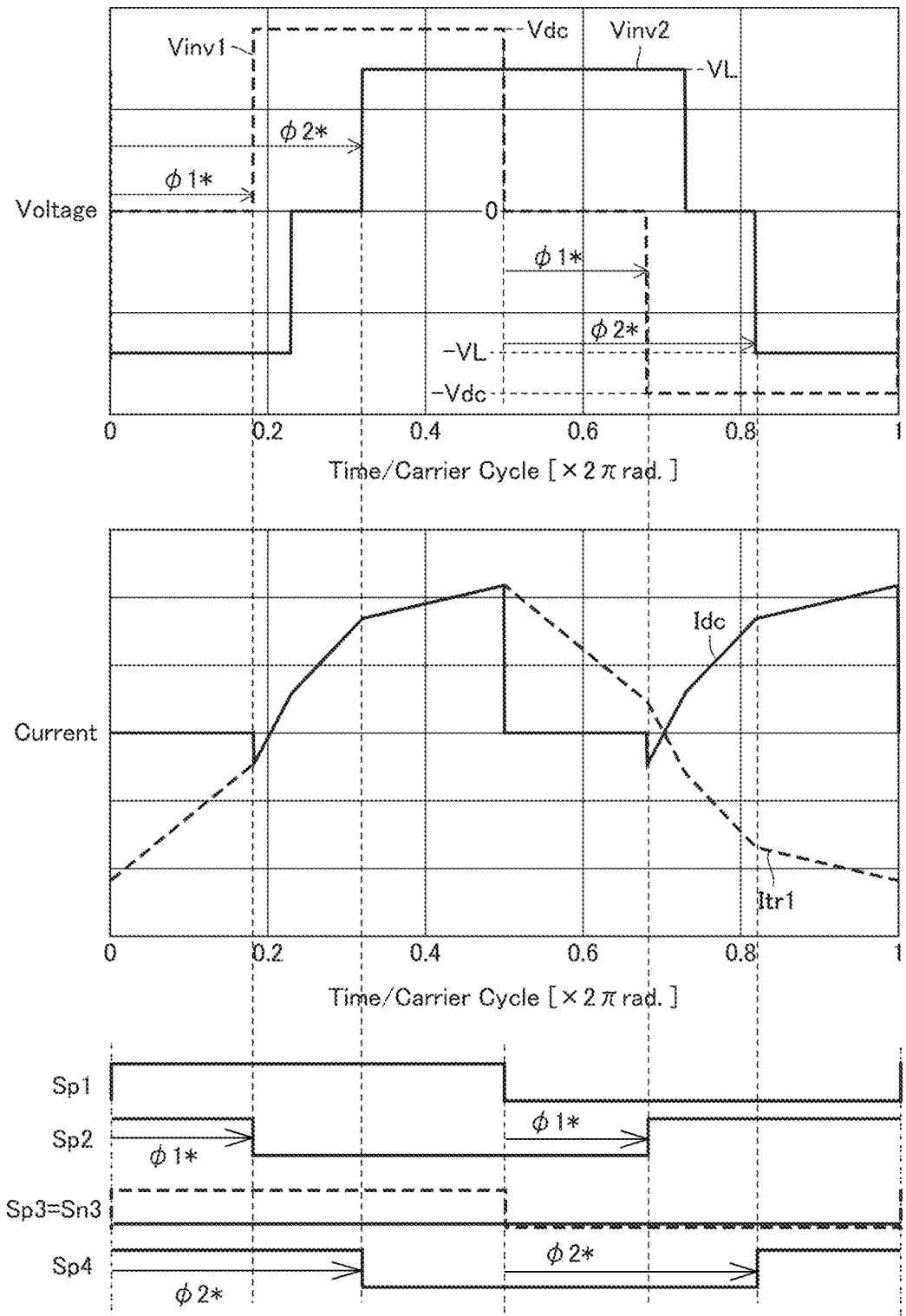
FIG. 22 is a waveform chart illustrating an example of a current state 3 in the discharge mode.

FIG. 22 is a waveform chart illustrating an example of current state 3 in the discharge mode. In current state 3 in the discharge mode of FIG. 22, first bridge voltage Vinv1 changes to 3 levels, second bridge voltage Vinv2 changes to 3 levels, and the period in which the current becomes 0 does not exist in current Itr of transformer Tr.

In current state 3 in the discharge mode of FIG. 22, the average value of current Idc for each carrier period Tc can be expressed by an equation (7) when current Idc is averaged, integrated, and arranged for each period in which Idc changes. At this point, for the purpose of simplification of the mathematical expression, Vdc (π−φ1*)/VL−(π−φ2*) is indicated by φa.

[Mathematical Formula 7]

Mathematical Formula 7

$$Idc = \frac{VLTc}{Ls} \frac{\phi 1^*(\phi 2^* + \phi a) - \pi(\phi 1^* - \phi 2^* - \phi a) - \phi 1^{*2} - \phi 2^{*2} - \phi a^2}{4\pi^2} \quad (7)$$

Figure 23:
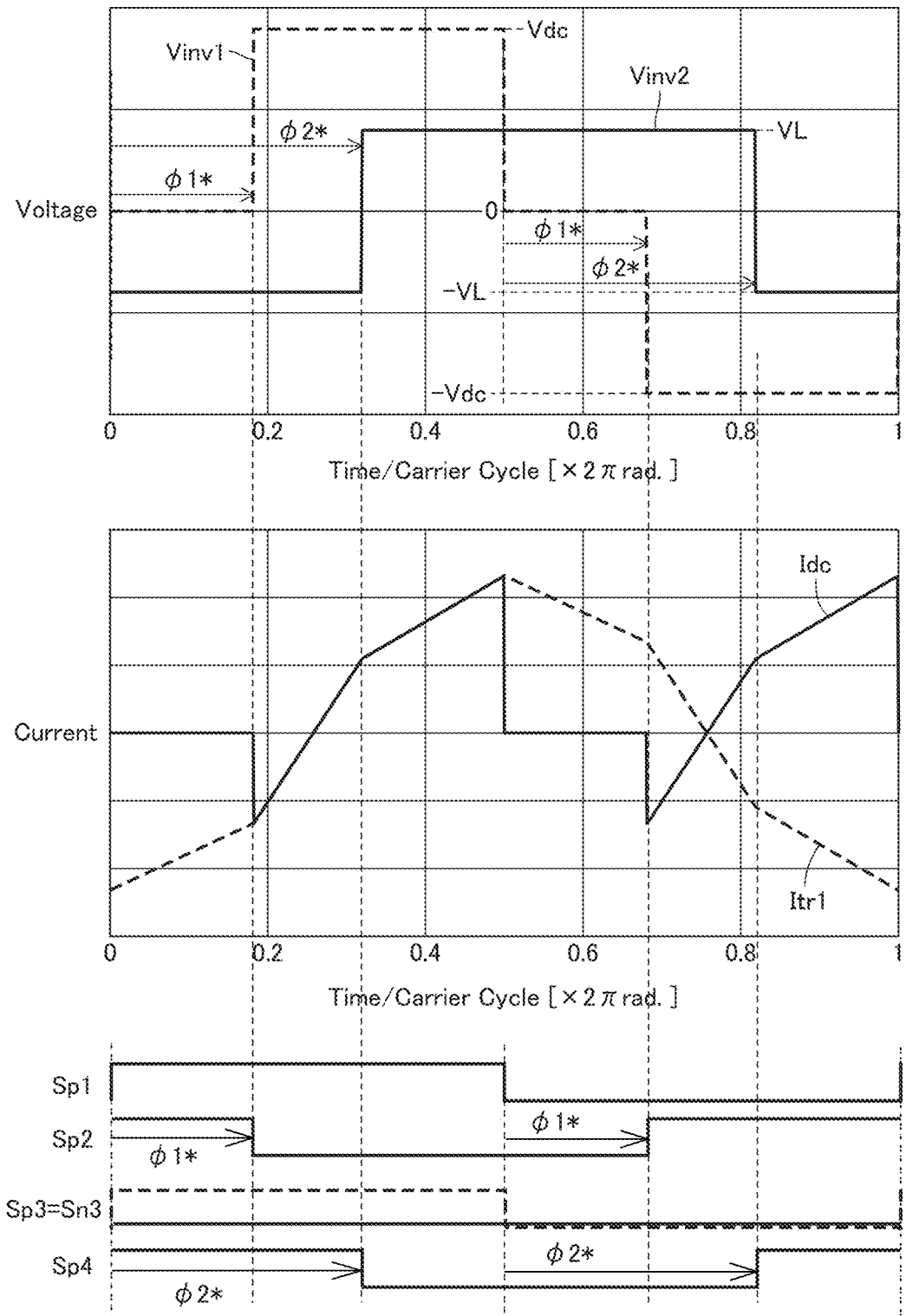
FIG. 23 is a waveform chart illustrating an example of a current state 4 in the discharge mode.

FIG. 23 is a waveform chart illustrating an example of current state 4 in the discharge mode. In current state 4 in the discharge mode of FIG. 23, first bridge voltage Vinv1 changes to 3 levels, second bridge voltage Vinv2 changes to 2 levels, and the period in which the current becomes 0 does not exist in current Itr of transformer Tr.

In current state 4 in the discharge mode of FIG. 23, the average value of current Idc for each carrier period Tc can be expressed by an equation (8) when current Idc is averaged, integrated, and arranged for each period in which Idc changes.

[Mathematical Formula 8]

Mathematical Formula 8

$$Idc = \frac{VLTc}{Ls} \frac{-\phi 1^{*2} - 2\phi 2^{*2} + 2\phi 1^* \phi 2^* - \pi \phi 1^* + 2\pi \phi 2^*}{4\pi^2} \quad (8)$$

Figure 24:
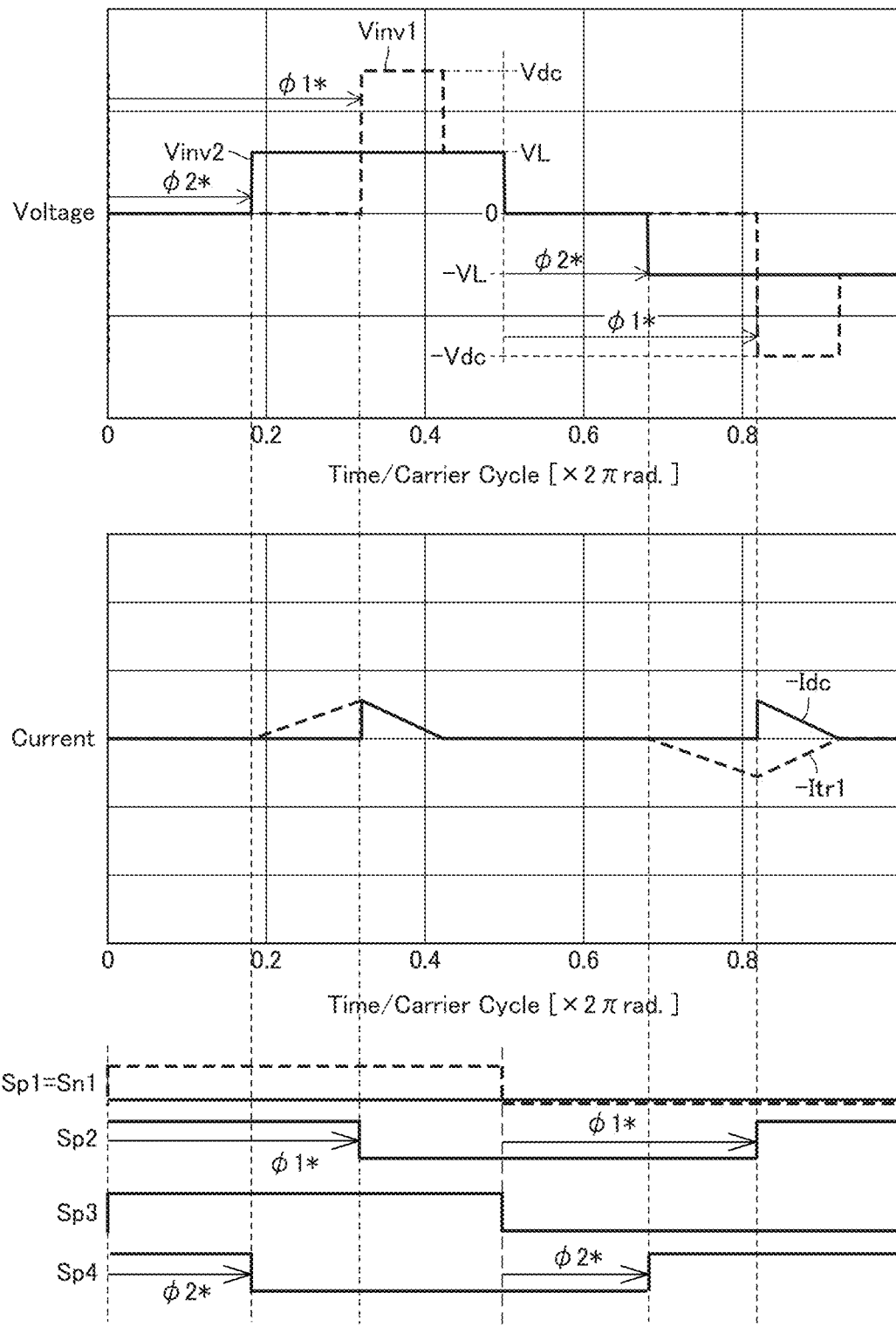
FIG. 24 is a waveform chart illustrating an example of the current state 1 in the charge mode.

FIG. 24 is a waveform chart illustrating an example of current state 1 in the charge mode. In current state 1 in the charge mode of FIG. 24, first bridge voltage Vinv1 changes to 5 levels, second bridge voltage Vinv2 changes to 3 levels, and the period in which the current becomes 0 exists in current Itr of transformer Tr.

In current state 1 in the charge mode of FIG. 24, the average value of current Idc for each carrier period Tc can be expressed by an equation (9) when current Idc is averaged, integrated, and arranged for each period in which Idc changes.

[Mathematical Formula 9]

Mathematical Formula 9

$$Idc = \frac{VLTc}{Ls}\frac{VL}{VL-Vdc}\left(\frac{\phi 1^* - \phi 2^*}{2\pi}\right)^2 \tag{9}$$

Figure 25:
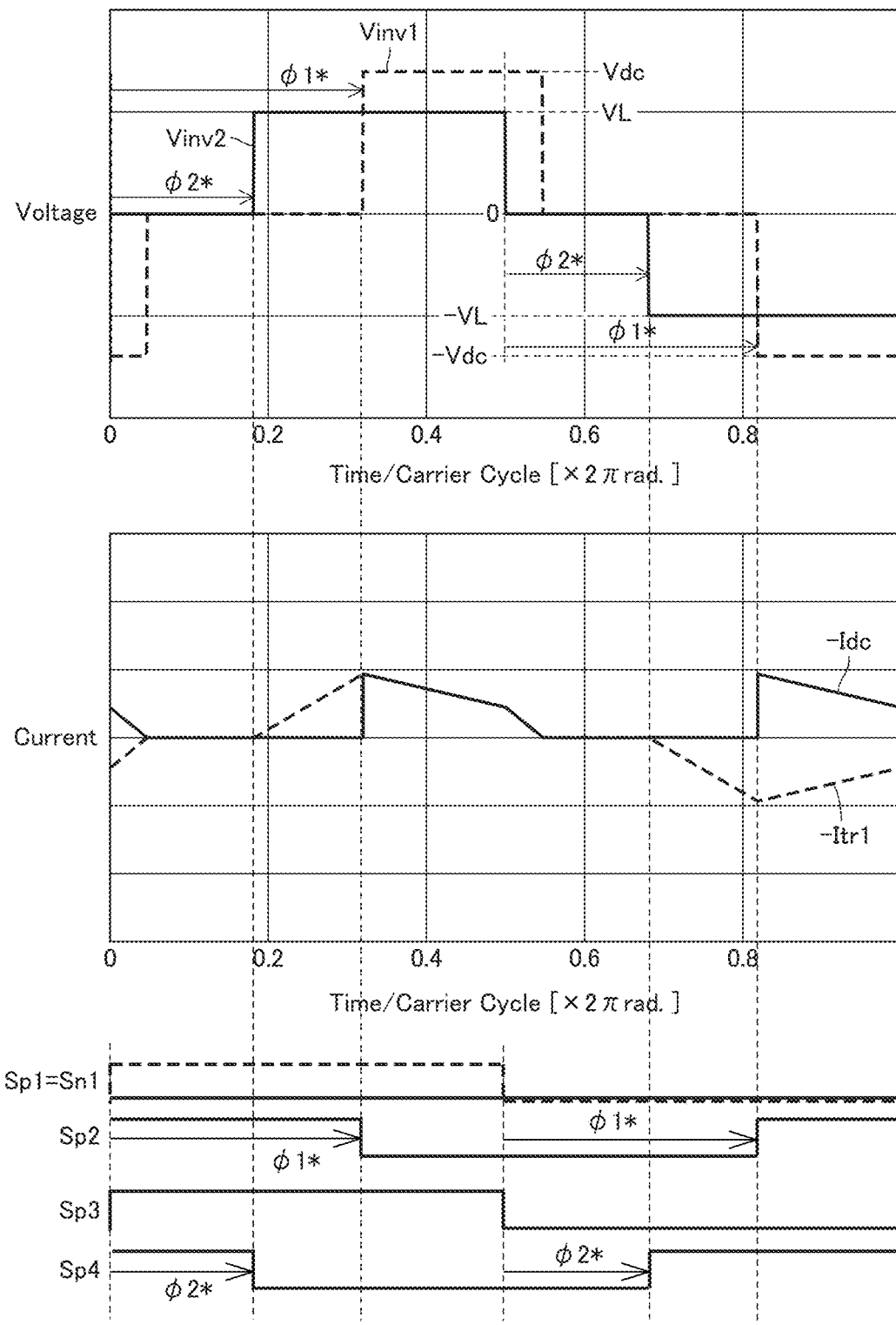
FIG. 25 is a waveform chart illustrating an example of the current state 2 in the charge mode.

FIG. 25 is a waveform chart illustrating an example of current state 2 in the charge mode. In current state 2 in the charge mode of FIG. 25, first bridge voltage Vinv1 changes to 3 levels, second bridge voltage Vinv2 changes to 3 levels, and the period in which the current becomes 0 exists in current Itr of transformer Tr.

In current state 2 in the charge mode of FIG. 25, the average value of current Idc for each carrier period Tc can be expressed by an equation (10) when current Idc is averaged, integrated, and arranged for each period in which Idc changes.

[Mathematical Formula 10]

Mathematical Formula 10

$$Idc = \frac{VLTc}{Ls}\frac{(\pi-\phi 1^*)^2 - \frac{VL}{Vdc}(\pi-\phi 2^*)^2}{4\pi^2} \tag{10}$$

Figure 26:
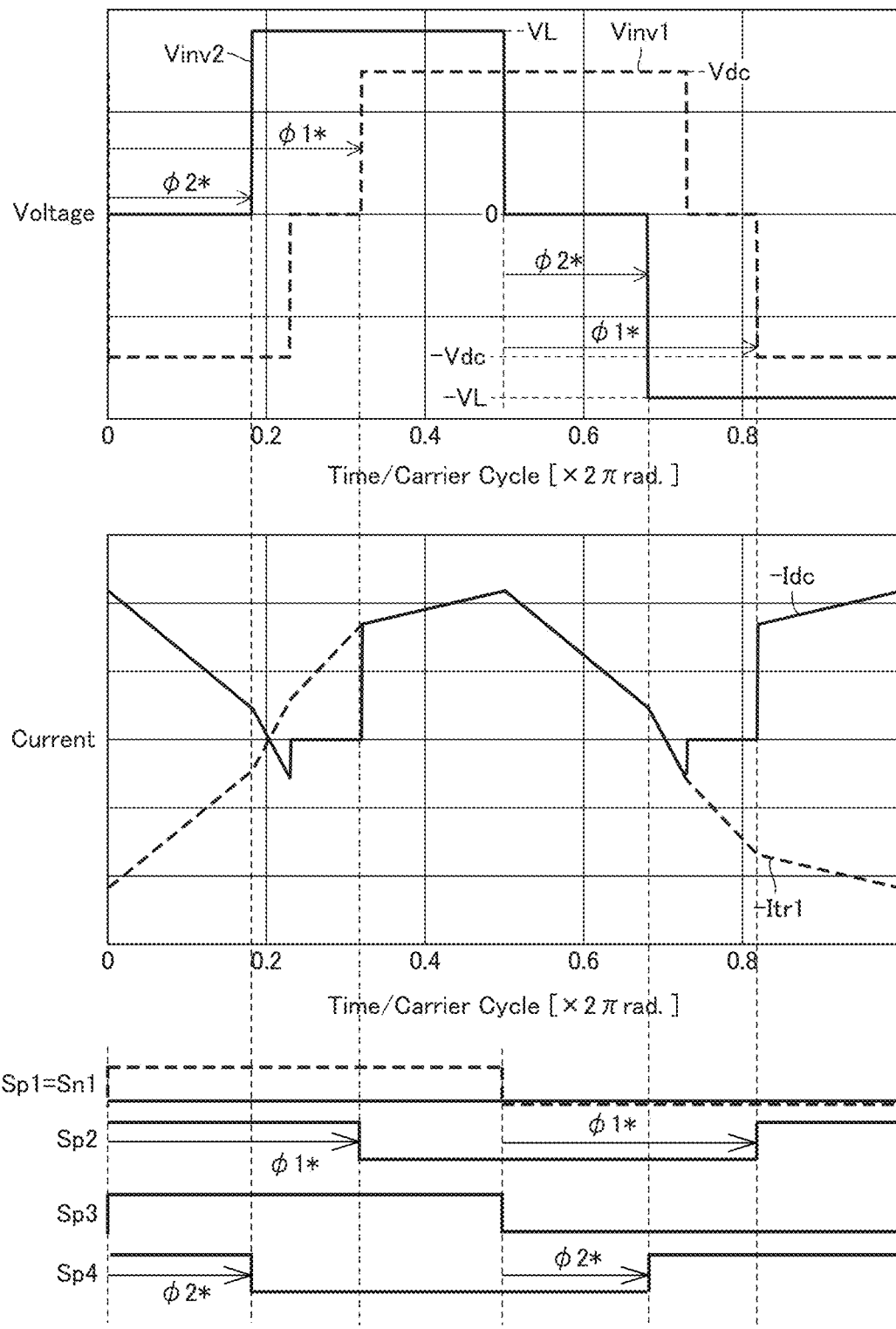
FIG. 26 is a waveform chart illustrating an example of the current state 3 in the charge mode.

FIG. 26 is a waveform chart illustrating an example of current state 3 in the charge mode. In current state 3 in the charge mode of FIG. 26, first bridge voltage Vinv1 changes to 3 levels, second bridge voltage Vinv2 changes to 3 levels, and the period in which the current becomes 0 does not exist in current Itr of transformer Tr.

In current state 3 in the charge mode of FIG. 26, the average value of current Idc for each carrier period Tc can be expressed by an equation (11) when current Idc is averaged, integrated, and arranged for each period in which Idc changes. At this point, for the purpose of simplification of the mathematical expression, $VL(\pi-\phi 2^*)/Vdc-(\pi-\phi 1^*)$ is indicated by $\phi b$.

[Mathematical Formula 11]

Mathematical Formula 11

$$Idc = \frac{VLTc}{Ls}\frac{\phi 1^{*2} + \phi 2^{*2} + \phi b^2 - \pi(\phi 1^* - \phi 2^* + \phi b) - \phi 2^*(\phi 1^* + \phi b)}{4\pi^2} \tag{11}$$

Figure 27:
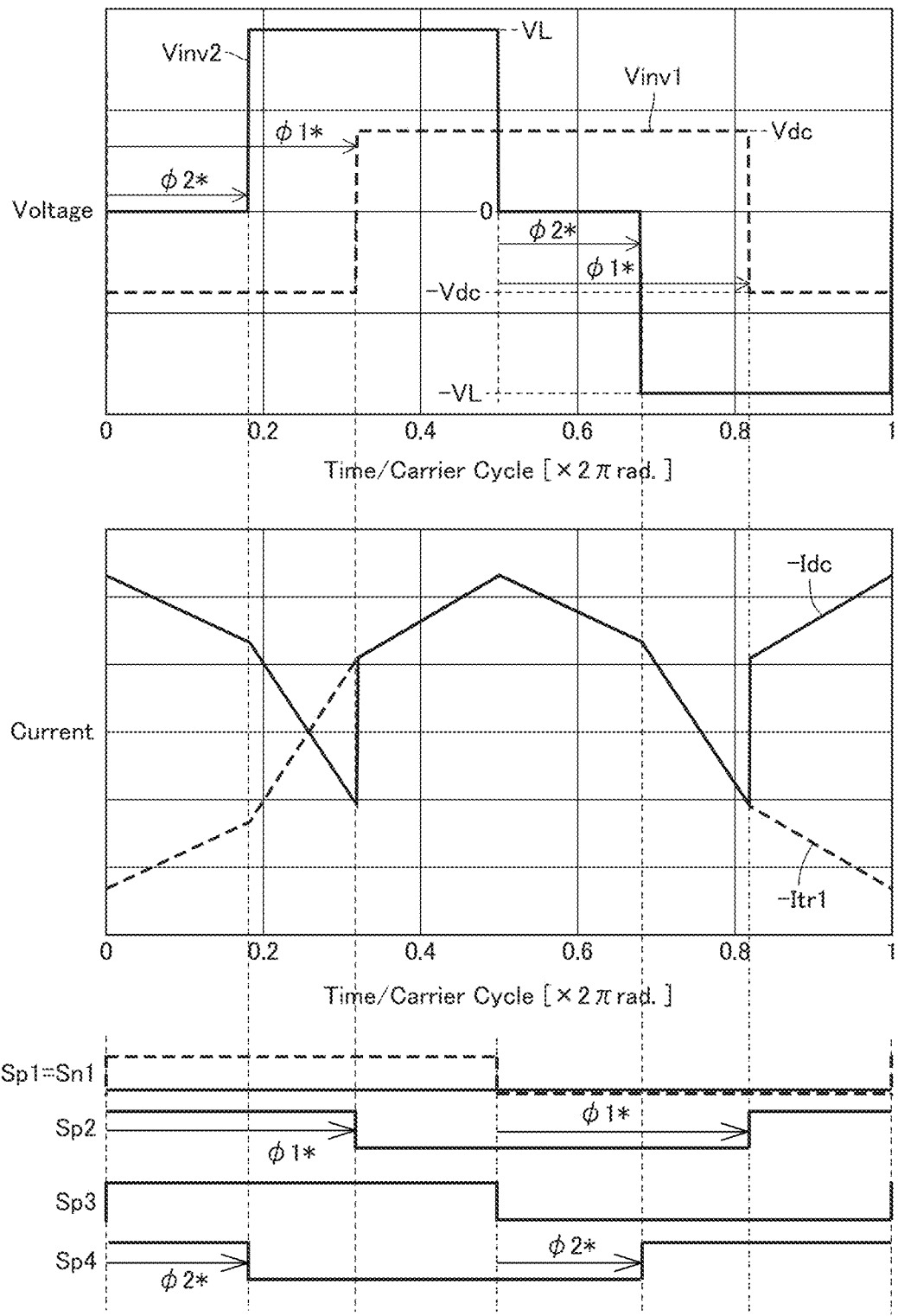
FIG. 27 is a waveform chart illustrating an example of the current state 4 in the charge mode.

FIG. 27 is a waveform chart illustrating an example of current state 4 in the charge mode. In current state 4 in the charge mode of FIG. 27, first bridge voltage Vinv1 changes to 2 levels, second bridge voltage Vinv2 changes to 3 levels, and the period in which the current becomes 0 does not exist in current Itr of transformer Tr.

In current state 4 in the charge mode of FIG. 27, the average value of current Idc for each carrier period Tc can be expressed by an equation (12) when current Idc is averaged, integrated, and arranged for each period in which Idc changes.

[Mathematical Formula 12]

Mathematical Formula 12

$$Idc = \frac{VLTc}{Ls}\frac{\phi 2^{*2} + 2\phi 1^{*2} - 2\phi 1^*\phi 2^* + \pi\phi 2^* - 2\pi\phi 1^*}{4\pi^2} \tag{12}$$

At this point, in the region (loss reduction region) where the range of duty instruction value D* is −0.25 to 0.25, when 180°=π in FIG. 17, phase shift amounts φ1*, φ2* in the discharge mode (D*>0) are set to π(1−2D*) using duty instruction value D*, and become the same value. When this is applied to the equations (5), (6), (8), current state 1, charge state 2, and current state 4 in the discharge mode can be expressed by the following equations (13), (14), (15), respectively.

Mathematical Formula 13

Mathematical Formula 13

$$Idc = 0 \tag{13}$$

[Mathematical Formula 14]

Mathematical Formula 14

$$Idc = \frac{Tc}{Ls}(Vdc - VL)D^{*2} \tag{14}$$

[Mathematical Formula 15]

Mathematical Formula 15

$$Idc = \frac{VLTc}{Ls}\frac{D^* - 2D^{*2}}{2} \tag{15}$$

In the region (loss reduction region) where the range of duty instruction value D* is −0.25 to 0.25, when 180°=A in FIG. 17, phase shift amounts φ1*, φ2* in the charge mode (D*<0) are set to π(1+2D*) using duty instruction value D*, and become the same value. When this is applied to the equations (5), (6), (8), current state 1, charge state 2, and current state 4 in the charge mode can be expressed by the following equations (16), (17), (18).

Mathematical Formula 16

Mathematical Formula 16

$$Idc = 0 \tag{16}$$

[Mathematical Formula 17]

Mathematical Formula 17

$$Idc = \frac{Tc}{Ls}\frac{VL}{Vdc}(Vdc - VL)D^{*2} \tag{17}$$

-continued

[Mathematical Formula 18]

Mathematical Formula 18

$$Idc = \frac{VLTc}{Ls} \frac{2D^{*2} - D^*}{2} \tag{18}$$

Because the values of phase shift amounts φ1*, φ2* are set to the same value in the loss reduction region in which duty instruction value D* is −0.25 to 0.25, current Itr of transformer Tr always has the period in which the current is 0 unless one of first bridge voltage Vinv1 and second bridge voltage Vinv2 becomes the 2 level. That is, because current state 3 in which first bridge voltage Vinv1 and second bridge voltage Vinv2 become 3 levels does not exist in the loss reduction region, the equation indicating Idc is not described above.

In the high output region where duty instruction value D* is less than or equal to −0.25 or greater than or equal to 0.25, current states 1 to 4 in the discharge mode can be expressed by the following equations (19) to (22), respectively. At this point, when 180°=π in FIG. 17, using duty instruction value D*, phase shift amount φ1* in the discharge mode (D*>0) is expressed as π(1−2D*), and phase shift amount φ2* is expressed as 2πD*. When this is applied to the equations (5) to (8), the following equations (19) to (22) are obtained.

[Mathematical Formula 19]

Mathematical Formula 19

$$Idc = \frac{VdcTc}{Ls} \frac{VL}{VL - Vdc} \left(\frac{1 - 4D^*}{2}\right)^2 \tag{19}$$

[Mathematical Formula 20]

Mathematical Formula 20

$$Idc = \frac{Tc}{Ls}\left\{VdcD^{*2} - VL\left(\frac{1-2D^*}{2}\right)^2\right\} \tag{20}$$

[Mathematical Formula 21]

Mathematical Formula 21

$$Idc = \frac{VLTc}{Ls} \frac{(8D^* - 12D^{*2})\frac{Vdc}{VL} - \left(2D^*\frac{Vdc}{VL}\right)^2 - 5(1 - 2D^*)^2}{4} \tag{21}$$

[Mathematical Formula 22]

Mathematical Formula 22

$$Idc = \frac{VLTc}{Ls} \frac{-1 + 7D^* - 10D^{*2}}{2} \tag{22}$$

At this point, in the high output region where duty instruction value D* is less than or equal to −0.25, or greater than or equal to 0.25, when 180°=π in FIG. 17, phase shift amount φ1* of the charge mode (D*<0) is expressed as −2πD* using duty instruction value D*, and phase shift amount φ2* is expressed as π(1+2D*). When this is applied to the equations (5) to (8), current states 1 to 4 in the charge mode can be expressed by the following equations (23) to (26), respective y.

[Mathematical Formula 23]

Mathematical Formula 23

$$Idc = \frac{VLTc}{Ls} \frac{VL}{VL - Vdc} \left(\frac{1 + 4D^*}{2}\right)^2 \tag{23}$$

[Mathematical Formula 24]

Mathematical Formula 24

$$Idc = \frac{VLTc}{Ls} \frac{1 + 4D^* + 4\left(1 - \frac{VL}{Vdc}\right)D^{*2}}{4} \tag{24}$$

[Mathematical Formula 25]

Mathematical Formula 25

$$Idc = \frac{VLTc}{Ls} \frac{(8D^* + 12D^{*2})\frac{Vdc}{VL} + \left(2D^*\frac{Vdc}{VL}\right)^2 + 5(1 + 2D^*)^2}{4} \tag{25}$$

[Mathematical Formula 26]

Mathematical Formula 26

$$Idc = \frac{VLTc}{Ls} \frac{1 + 7D^* + 10D^{*2}}{2} \tag{26}$$

As described above in Table 5, operation mode detector 403 determines the operation mode using the relationships of the equations (13) to (26).

In the loss reduction region where duty instruction value D* is −0.25 to 0.25, because current state 3 does not exist as described above, operation mode M becomes any one of current state 1, current state 2, and current state 4 of the discharge mode or current state 1, current state 2, and current state 4 of the charge mode.

Because the state in which duty instruction value D* is 0 corresponds to the boundary between the charge mode and the discharge mode, a new "zero mode" may be provided, or included in either the charge mode or the discharge mode.

In the case of the discharge mode in which duty instruction value D* is the positive value, operation mode M can be determined as C1: current state 1 when Vdc/VL is smaller than 1, and can be determined as C2: current state 2 or C4: current state 4 when Vdc/VL is greater than or equal to 1.

In addition, operation mode detector 403 can determine whether operation mode M is C2: current state 2 or C4: current state 4 using the boundary expression in which ide of the equation (14) representing current state 2 and Idc of the equation (15) representing current state 4 are matched with each other and the duty instruction value of PWM controller 603. That is, two currents ide of the two boundary modes are matched with each other in the boundary condition, so that the boundary can be obtained by solving the two modes with respect to duty instruction value D*. When duty instruction value D*, which is the solution, is set as a boundary value A, it can be determined which mode corresponds to duty instruction value D* when duty instruction value D* is greater than or equal to A or less than A. The condition that duty instruction value D* is matched with A is a boundary between two modes, and thus may be included in either mode.

In the case of the charge mode in which duty instruction value D* has the negative value, operation mode M can be determined as C5: current state 1 when VL/Vdc is less than 1, and can be determined as C6: current state 2 or C8: current state 4 when VL/Vdc is greater than or equal to 1.

In addition, operation mode detector 403 can determine whether operation mode M is C6: current state 2 or C8:

current state 4 using the boundary expression in which Idc of the equation (17) representing current state 2 and Idc of the equation (18) representing current state 4 are matched with each other and the duty instruction value of PWM controller 603.

In the high output region where duty instruction value D* is less than or equal to −0.25 or greater than or equal to 0.25, the boundary equation determining the operation mode is set as follows. The condition that Idc in the equation (19) and Idc in the equation (20) in the discharge mode are matched with each other is the boundary equation between C1: current state 1 and C2: current state 2. In addition, the condition that ide in the equation (20) and Idc in the equation (21) are matched with each other is the boundary expression between C2: current state 2 and C3: current state 3. In addition, the condition that Idc in the equation (21) and Idc in the equation (22) are matched with each other is the boundary expression between C3: current state 3 and C4: current state 4. From the above boundary expressions, in the high output region, operation mode detector 403 can determine the current state in the discharge mode using the duty instruction value of PWM controller 603.

Similarly, in the high output region, the condition that Idc of the equation (23) and ide of the equation (24) in the charge mode are matched with each other is the boundary expression between C5: current state 1 and C6: current state 2. The condition that Idc in the equation (24) and Idc in the equation (25) are matched with each other is the boundary expression between C6: current state 2 and C7: current state 3. The condition that Idc in the equations (25) and Idc in the equation (26) are matched with each other is the boundary expression between C7: current state 3 and C8: current state 4. From the above boundary expressions, in the high output region, operation mode detector 403 can determine the current state in the charge mode using the duty instruction value of PWM controller 603.

As described above, operation mode detector 403 can detect the operation mode using duty instruction value D* of PWM controller 603. However, because the current control system of the switching circuit has a nonlinear gain characteristic for each operation mode, the characteristic of the current control system is hardly improved only by detecting the operation mode.

Figure 28:
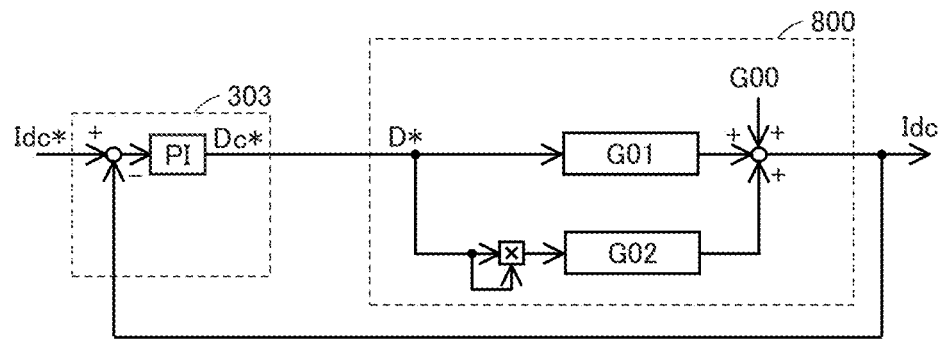
FIG. 28 is a control block diagram illustrating a study example of the power conversion device of the second embodiment.

FIG. 28 is a control block diagram illustrating a study example of the power conversion device of the second embodiment. FIG. 28 illustrates the control block related to the current control when compensator 503 of FIG. 16 does not exist. As indicated by a circuit gain 800 in FIG. 28, the gain of current Idc includes a gain G00 related to a constant term, a gain G01 related to the linear term, and a gain G02 related to the quadratic term of duty instruction value D* for each current state. Therefore, in circuit gain 800, the characteristic of the current control system changes largely according to the change in the current state. At this point, gains G00, G01, G02 correspond to the constant term, the linear term, and the quadratic term of right side D* of the equations (13) to (26).

As illustrated in the equations (13) to (26), because the constant term, the linear term, and the quadratic term of D* are different for each current state, the transfer function from current controller 303 to current sensor CT10 has nonlinearity different for each operation mode, and it can be seen that the transfer function has the large influence on the characteristic of the current control system.

Figure 29:
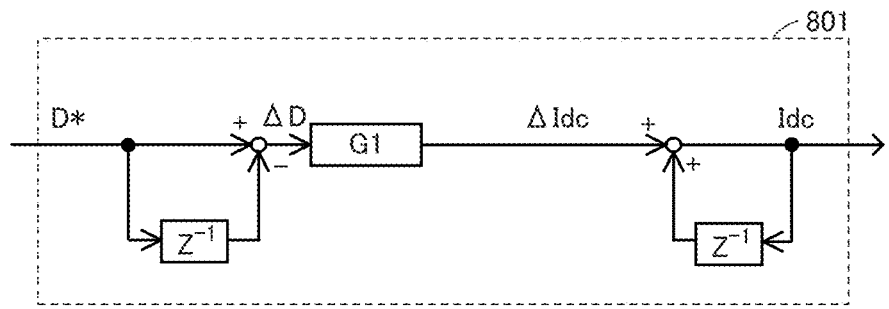
FIG. 29 is a control block diagram illustrating a circuit gain 801 obtained by equivalently converting a circuit gain 800.

FIG. 29 is a control block diagram illustrating a circuit gain 801 obtained by equivalently converting circuit gain 800. Focusing on the relationship between current Idc of circuit gain 800 and minute change amounts ΔI and ΔD of duty instruction value D*, circuit gain 800 can be equivalently converted into a gain G1 having a proportional relationship indicated by circuit gain 801.

Figure 30:
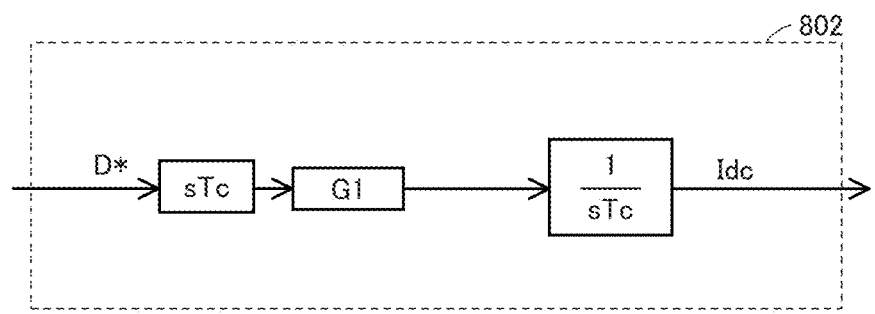
FIG. 30 is a control block diagram illustrating a circuit gain 802 obtained by equivalently converting the circuit gain 800.

FIG. 30 is a control block diagram illustrating a circuit gain 802 obtained by equivalently converting circuit gain 800. Circuit gain 802 is an equivalent block representing, in a continuous form, circuit gain 801 represented in a separated form. It is assumed that duty instruction value D* is a value less than or equal to the absolute value of 0.5 and that the change amount of the duty instruction value of PWM controller 603 for each operation is less than or equal to 0.1, the second power term of ΔD becomes less than or equal to 0.01 and is smaller than the first power term of ΔD by one order or more, so that the second power term of ΔD can be ignored.

In the region (loss reduction region) where the range of the duty instruction value D* is −0.25 to 0.25, the following equations (27) to (29) are obtained from the equations (13) to (15) representing current state 1, charge state 2, and current state 4 in the discharge mode. At this point, the relational expressions of ΔIdc and ΔD are extracted by replacing Idc and D* with Idc+ΔIdc and D*+ΔD. In equations (27) to (29), a coefficient on a right side ΔD is gain G1 that means a proportional relationship between ΔI and ΔD. In addition, a value before one arithmetic operation of the duty instruction value input to PWM controller 603 is used as D*.

Mathematical Formula 27

Mathematical Formula 27

$$\Delta I = 0 \tag{27}$$

[Mathematical Formula 28]

Mathematical Formula 28

$$\Delta I = \frac{Tc}{Ls}(Vdc - VL)2D^*\Delta D \tag{28}$$

[Mathematical Formula 29]

Mathematical Formula 29

$$\Delta I = \frac{VdcTc}{Ls}\frac{(1-4D^*)}{2}\Delta D \tag{29}$$

Similarly, in the region (loss reduction region) where the range of duty instruction value D* is −0.25 to 0.25, the following equations (30) to (32) are obtained from the equations (16) to (18) representing current state 1, charge state 2, and current state 4 of the charge mode. In the equations (30) to (32), the coefficient of right side ΔD is gain G1 that means the proportional relationship between ΔI and ΔD.

Mathematical Formula 30

Mathematical Formula 30

$$\Delta I = 0 \tag{30}$$

[Mathematical Formula 31]

Mathematical Formula 31

$$\Delta I = \frac{Tc}{Ls}\frac{VL}{Vdc}(Vdc - VL)2D^*\Delta D \tag{31}$$

[Mathematical Formula 32]

Mathematical Formula 32

$$\Delta I = \frac{VdcTc}{Ls}\frac{(1 + 4D^*)\Delta D}{2} \tag{32}$$

Similarly, in the high output region where duty instruction value D* is less than or equal to −0.25 or greater than or equal to 0.25, the following equations (33) to (36) are obtained from the equations (19) to (22) representing current states 1 to 4 in the discharge mode. In the equations (33) to (36), the coefficient of right side ΔD is gain G1 that means the proportional relationship between ΔI and ΔD.

[Mathematical Formula 33]

Mathematical Formula 33

$$\Delta I = \frac{VdcTc}{Ls}\frac{VL}{VL - Vdc}(4D^* - 1)2\Delta D \tag{33}$$

[Mathematical Formula 34]

Mathematical Formula 34

$$\Delta I = \frac{Tc}{Ls}\{2VdcD^* - VL(2D^* - 1)\}\Delta D \tag{34}$$

[Mathematical Formula 35]

Mathematical Formula 35

$$\Delta I = \frac{VLTc}{Ls}\left\{2(1 - 3D^*)\frac{Vdc}{VL} - 2D^*\left(\frac{Vdc}{VL}\right)^2 + 5(1 - 2D^*)\right\}\Delta D \tag{35}$$

[Mathematical Formula 36]

Mathematical Formula 36

$$\Delta I = \frac{VdcTc}{Ls}\frac{7 - 20D^*}{2}\Delta D \tag{36}$$

Similarly, in the high output region where the duty instruction value D* is less than or equal to −0.25 or greater than or equal to 0.25, the following equations (37) to (40) are obtained from the equations (23) to (26) representing current states 1 to 4 in the charge mode. In the equations (37) to (40), the coefficient of right side ΔD is gain G1 that means the proportional relationship between ΔI and ΔD.

[Mathematical Formula 37]

Mathematical Formula 37

$$\Delta I = \frac{VLTc}{Ls}\frac{VL}{VL - Vdc}2(1 + 4D^*)\Delta D \tag{37}$$

[Mathematical Formula 38]

Mathematical Formula 38

$$\Delta I = \frac{VLTc}{Ls}\left\{1 + \left(1 - \frac{Vdc}{VL}\right)2D^*\right\}\Delta D \tag{38}$$

[Mathematical Formula 39]

Mathematical Formula 39

$$\Delta I = \frac{VLTc}{Ls}\left\{2(1 + 3D^*)\frac{VL}{Vdc} + 2D^*\left(\frac{VL}{Vdc}\right)^2 + 5(1 + 2D^*)\right\}\Delta D \tag{39}$$

[Mathematical Formula 40]

Mathematical Formula 40

$$\Delta I = \frac{VdcTc}{Ls}\frac{7 + 20D^*}{2}\Delta D \tag{40}$$

Figure 31:
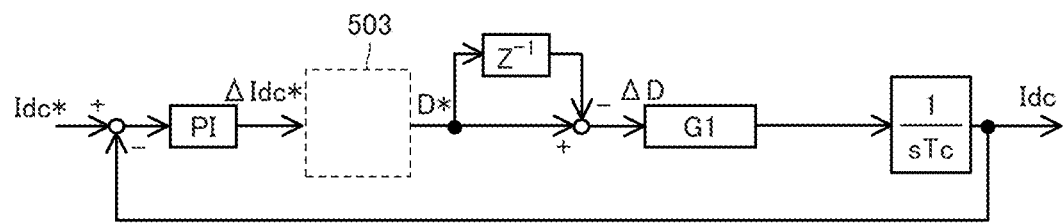
FIG. 31 is a control block diagram illustrating the power conversion device of the second embodiment.

FIG. 31 is a control block diagram illustrating the power conversion device of the second embodiment. FIG. 31 illustrates the control block related to the current control when compensator 503 exists in the power conversion device of the second embodiment.

Figure 32:
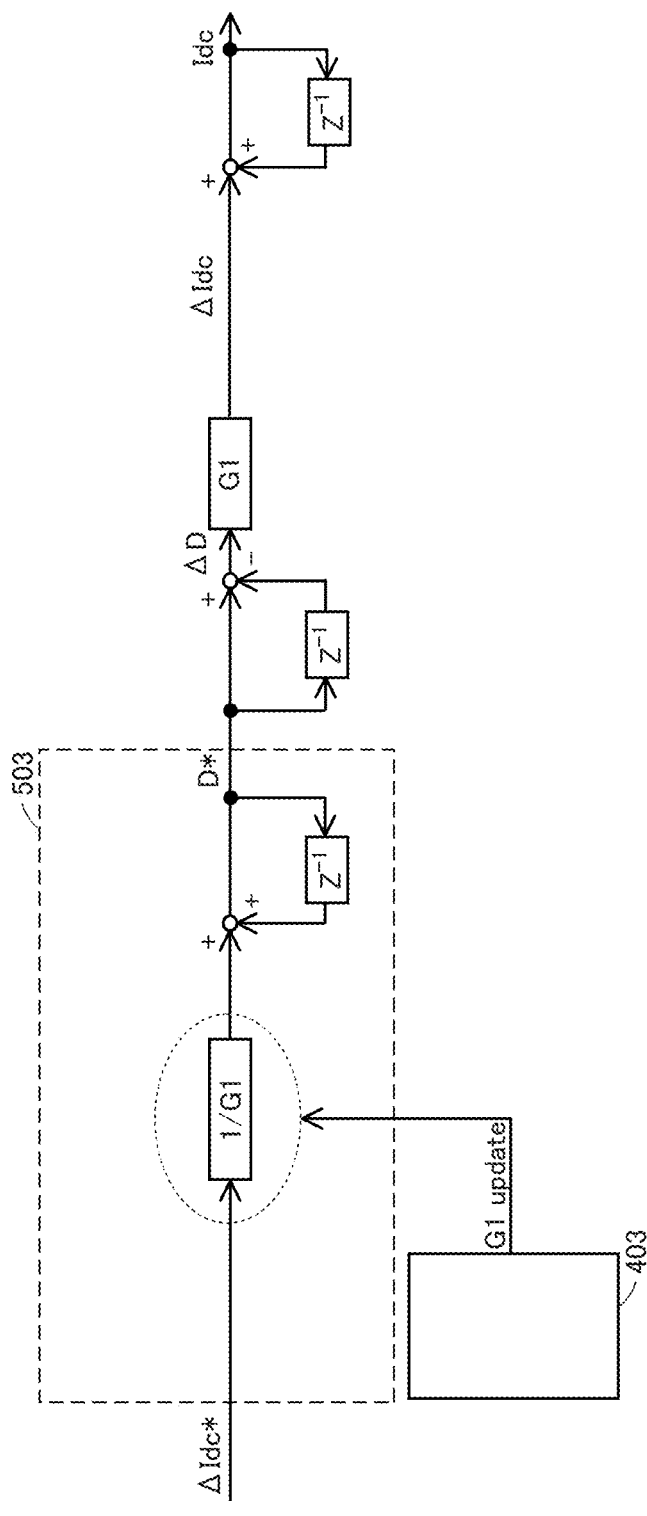
FIG. 32 is a block diagram illustrating details of a compensator 503.

FIG. 32 is a block diagram illustrating details of compensator 503. Compensator 503 cancels the influence of gain G1 by multiplying output ΔIdc* of current controller 303 by a reciprocal of gain G1. Furthermore, compensator 503 relaxes the nonlinearity of the current control system by adding ΔIdc*/G1 to the previous value of duty instruction value D*. From the equations (33) to (40), in the case where a polarity error is generated in the compensation due to the model error when ΔI decreases during the increase in ΔD, which leads to positive feedback of the control system. For example, when duty instruction value D* becomes larger than 0.35 in discharge mode equation (36) of current state 4 in the high output region, the polarities of ΔD and ΔI are inverted, and thus duty instruction value D* is preferably limited not to become larger than 0.35. Similarly, when duty instruction value D* becomes smaller than −0.35 in the equation (40) of the charge mode, the polarities of ΔD and ΔI are inverted, and thus duty instruction value D* is preferably limited not to become smaller than −0.35. In this manner, at least one of the upper limit value and the lower limit value of duty instruction value D* may be adjusted such that ΔI does not decrease when duty instruction value D* increases ΔD. In addition, compensator 503 may have a configuration in which only one of the function of mitigating the nonlinearity of the current control system described above and the function of adjusting at least one of the upper limit value and the lower limit value of duty instruction value D* suppressing the positive feedback of the current control system is mounted.

Figure 33:
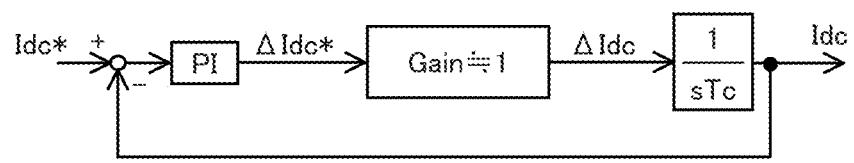
FIG. 33 is a control block diagram obtained by performing equivalent conversion on FIG. 31.

FIG. 33 is a control block diagram obtained by performing equivalent conversion on FIG. 31. Operation mode detector 403 can estimate the current state of the lower classification for the charge mode or the discharge mode using the above-described information. For this reason, compensator 503 can select gain G1 that is the coefficient of ΔD in the equations (27) to (40) according to the current state.

In FIGS. 34 to 39, a power conversion device having a configuration without a compensator is compared with the power conversion device of the second embodiment.

Figure 34:
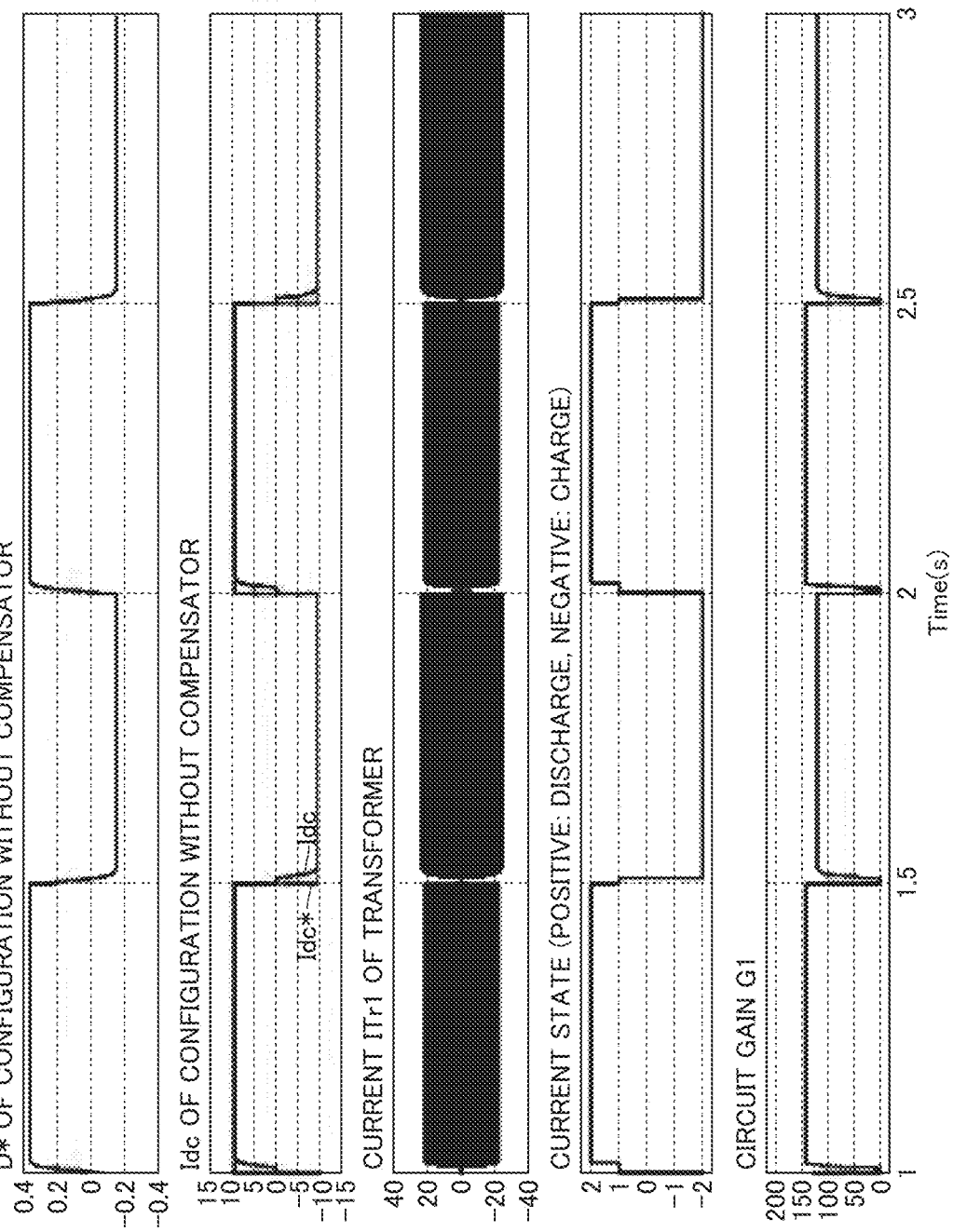
FIG. 34 is a waveform diagram illustrating current and voltage characteristics of a power conversion device of a comparative example having a configuration without a compensator.
Figure 35:
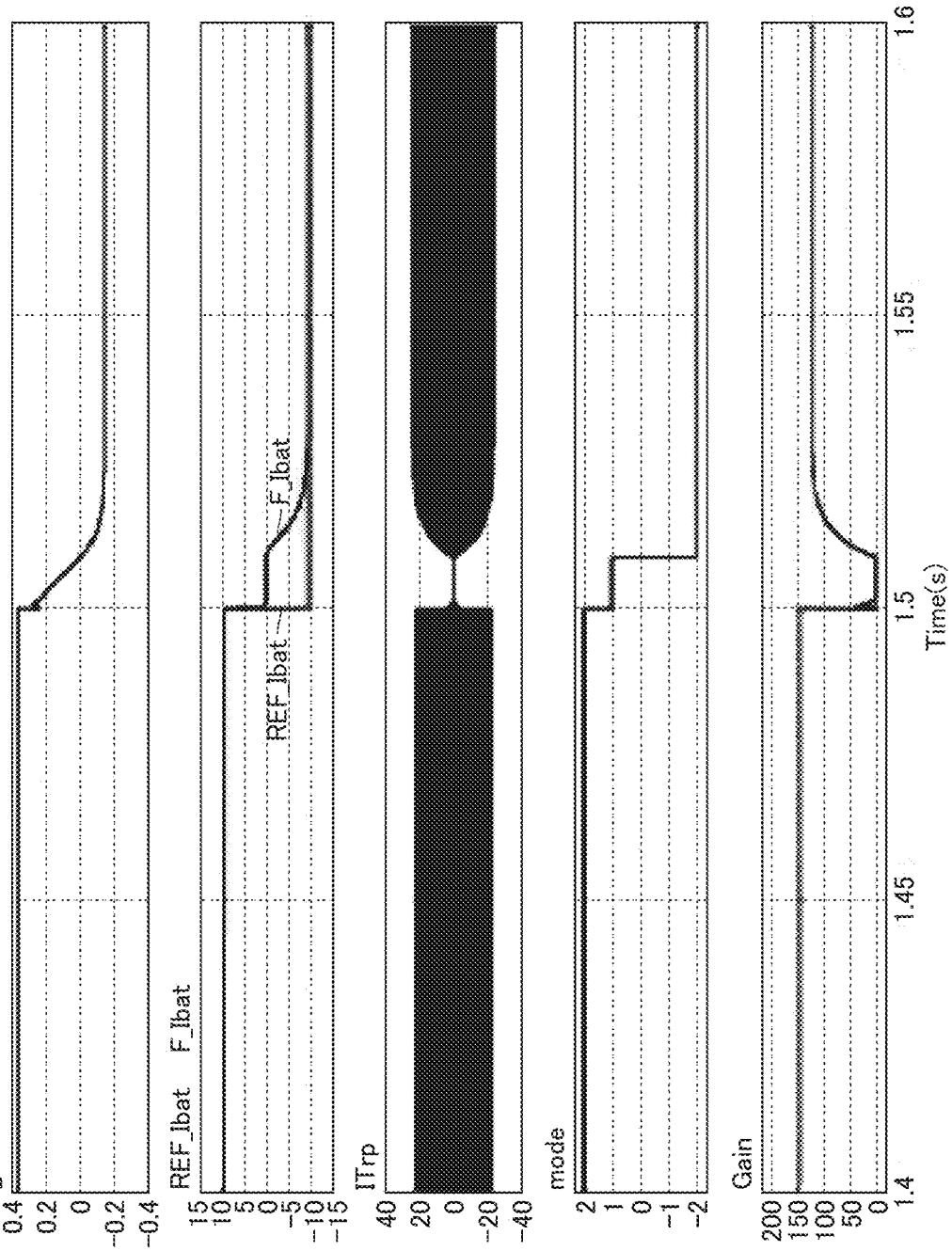
FIG. 35 is an enlarged waveform diagram illustrating a portion obtained by stepping down a current instruction in FIG. 34.
Figure 36:
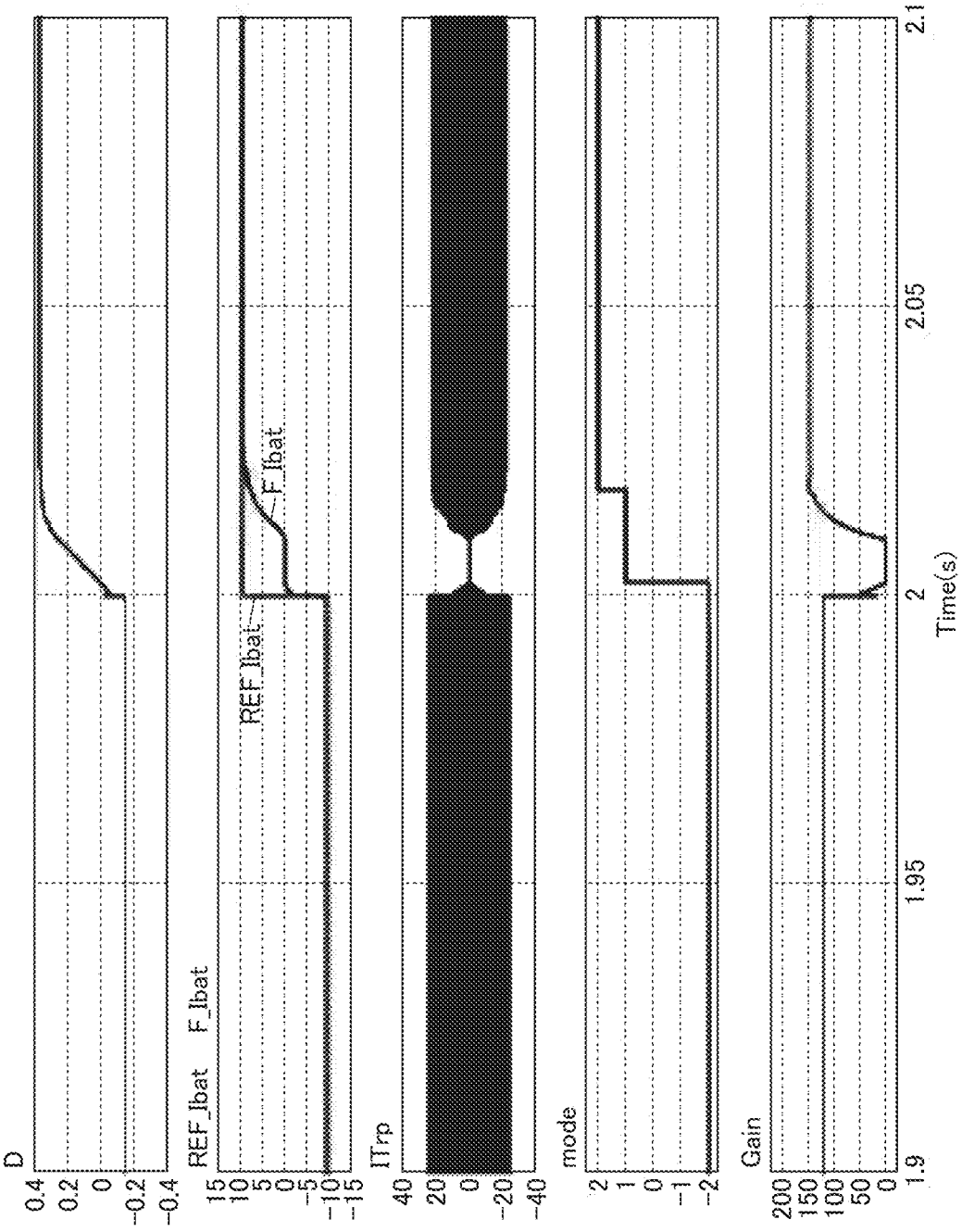
FIG. 36 is an enlarged waveform diagram illustrating a portion obtained by stepping up the current instruction in FIG. 34.

FIG. 34 is a waveform diagram illustrating current and voltage characteristics of a power conversion device of a comparative example having a configuration without the compensator. FIG. 35 is an enlarged waveform diagram illustrating a portion obtained by stepping down a current instruction in FIG. 34. FIG. 36 is an enlarged waveform diagram illustrating a portion obtained by stepping up the current instruction in FIG. 34.

Figure 37:
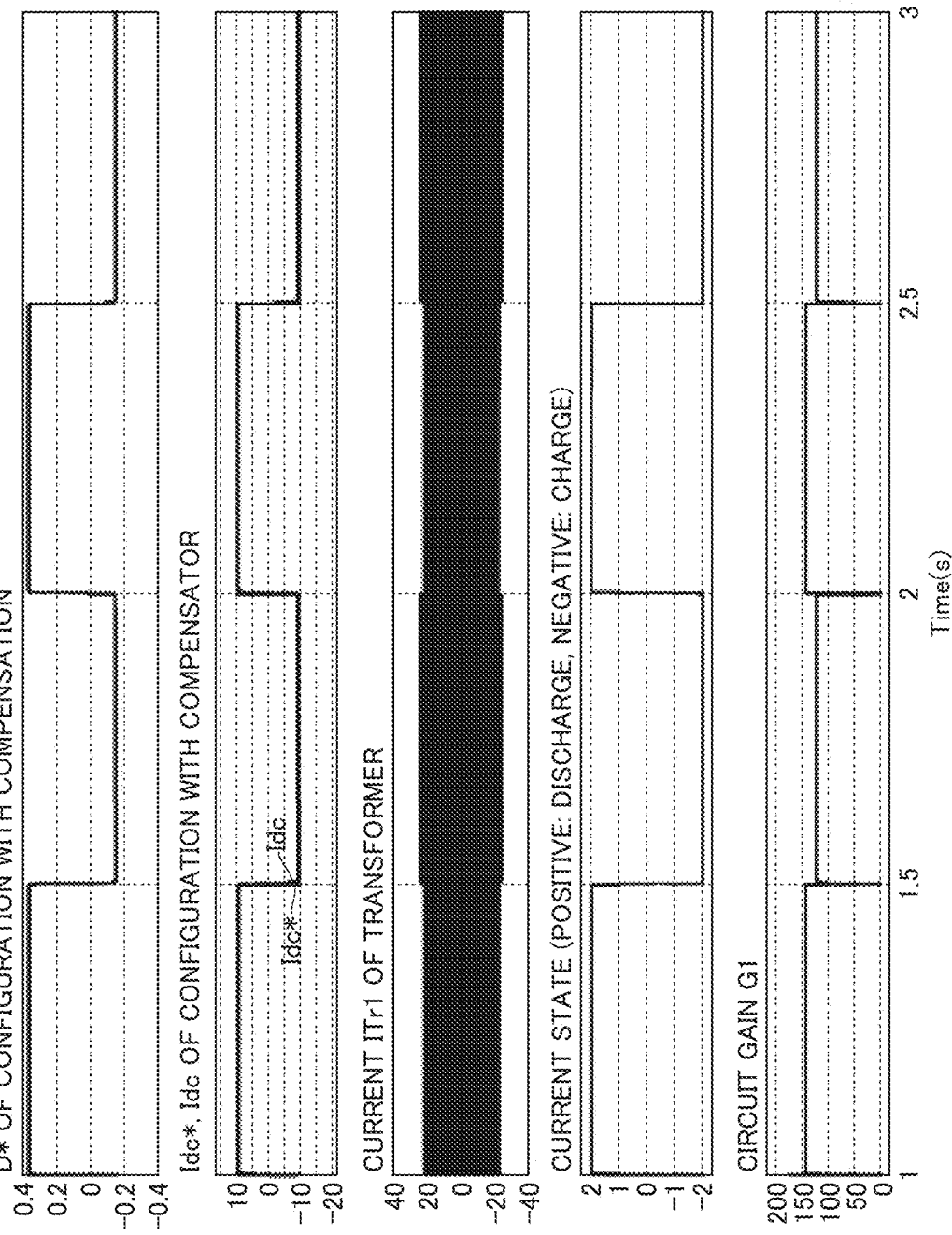
FIG. 37 is a waveform chart illustrating the current and voltage characteristics of the power conversion device of the second embodiment in which the compensator is provided.
Figure 38:
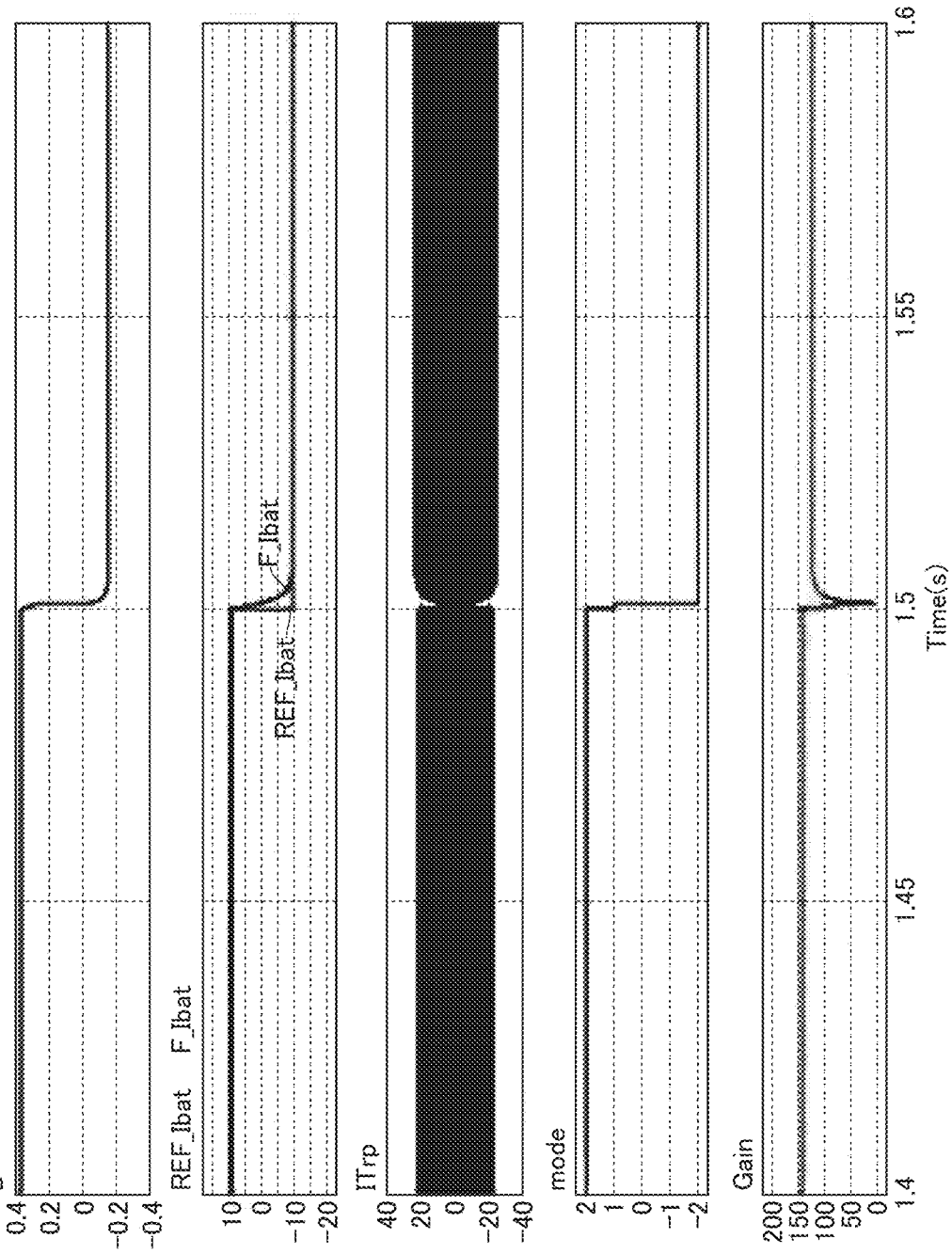
FIG. 38 is an enlarged waveform chart illustrating a portion obtained by stepping down the current instruction in FIG. 37.
Figure 39:
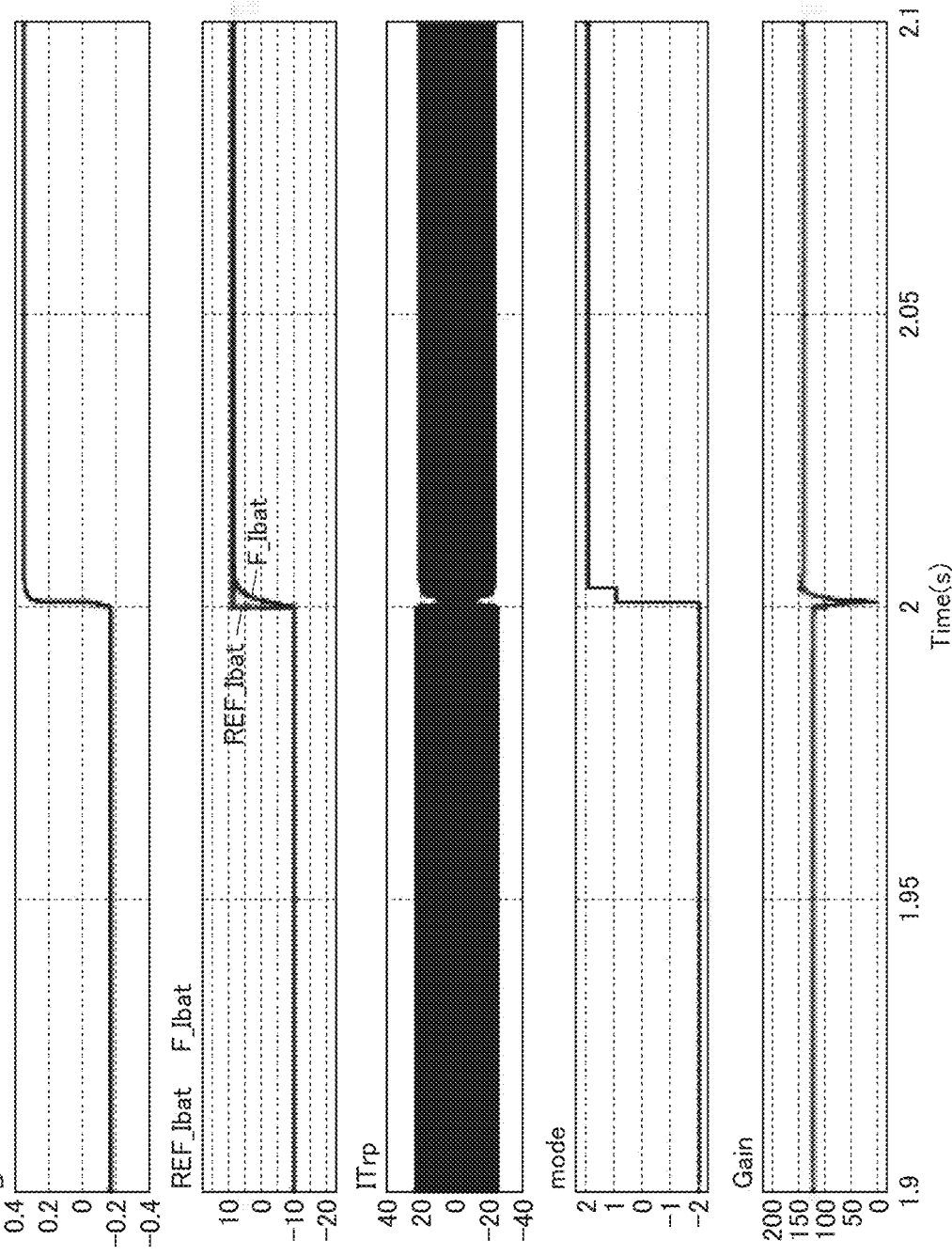
FIG. 39 is an enlarged waveform chart illustrating a portion obtained by stepping up the current instruction in FIG. 37.

FIG. 37 is a waveform chart illustrating the current and voltage characteristics of the power conversion device of the second embodiment in which the compensator is provided. FIG. 38 is an enlarged waveform chart illustrating a portion obtained by stepping down the current instruction in FIG. 37. FIG. 39 is an enlarged waveform chart illustrating a portion obtained by stepping up the current instruction in FIG. 37.

FIGS. 34 to 39 illustrate the current and the voltage when the discharge mode, the charge mode, and the current state of these lower classifications transiently change. In each of FIGS. 34 to 39, duty instruction values D*, Idc*, and Idc, current ITr1 of the transformer, the current state, and circuit gain G1 are illustrated from the top.

It can be seen that a distortion tendency of current Idc with respect to instruction value Idc* due to the switching between the discharge mode and the charge mode and the switching of the current states of these lower classifications in the configuration with the compensators in FIGS. 37 to 39 with respect to the configuration without the compensator in FIGS. 34 to 39 is mitigated when comparing the waveforms in FIGS. 34 to 36 with the waveforms in FIGS. 37 to 39. In FIGS. 34 to 39, the waveform indicating the current state indicates the estimation result of the current state when the current state in the discharge mode is set to positive value and when the current state in the charge mode is set to the negative value.

When the tendency to be distorted is mitigated in this manner, the following effects are obtained as a result. That is, the nonlinearity of the current control system associated with the circuit gain change is mitigated, and the current and the voltage in the current control system can be handled by the unified current control system in FIG. 33. For example, when the current control system in which the compensator of the second embodiment is not used is provided in a minor loop in order to control voltage VL in FIG. 16, the design of the voltage control of voltage VL becomes complicated, and it is difficult to achieve high-speed response. On the other hand, in the voltage control system of voltage VL having the current control system of the second embodiment in the minor loop, the control design is simplified, and high-speed response becomes easy. When voltage VL is controlled, the higher the speed response, the smaller the voltage change during attaching and detaching the load, and the capacity component (C) that is an energy buffer connected in parallel with the load can also be reduced.

FIGS. 40 to 45 illustrate types of bidirectional insulating converter 203.

Figure 40:
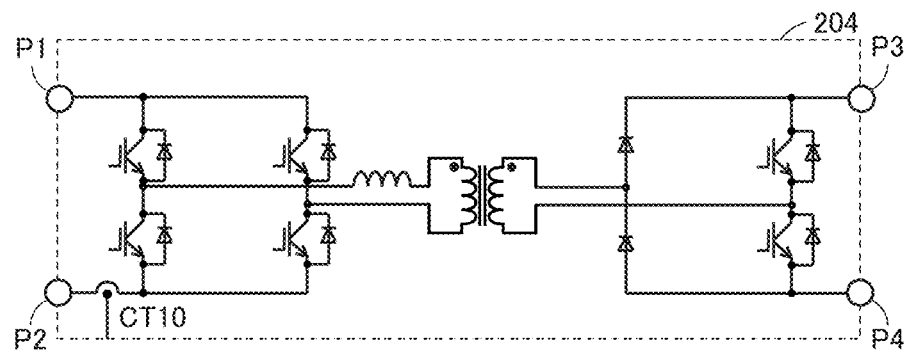
FIG. 40 is a view illustrating a first type of a bidirectional insulating converter 203.

When upper arm Sp3 and lower arm Sn3 are always turned off in the discharge mode as illustrated in FIG. 18, only the diode is effective, so that bidirectional insulating converter 203 of FIG. 16 can be replaced with the unidirectional insulating converter 204 in FIG. 40 as the circuit configuration capable of implementing only the discharge mode.

Figure 41:
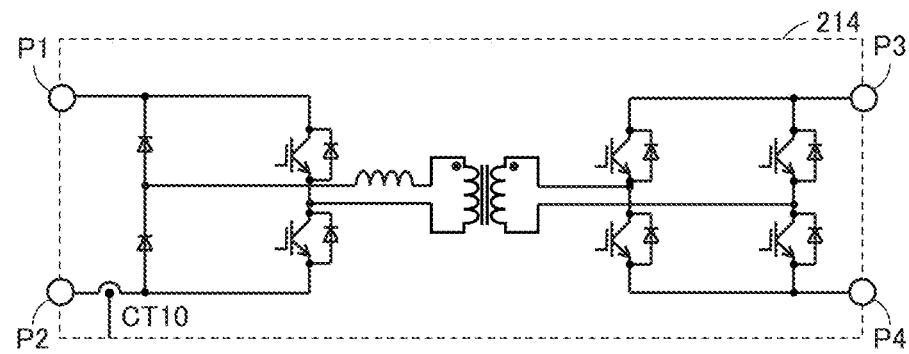
FIG. 41 is a view illustrating a second type of the bidirectional insulating converter 203.

Similarly, when upper arm Sp1 and lower arm Sn are always turned off in the charge mode as illustrated in FIG. 19, only the diode is effective, so that bidirectional insulating converter 203 can be replaced with unidirectional insulating converter 214 in FIG. 41 as the circuit configuration capable of implementing only the charge mode.

Figure 42:
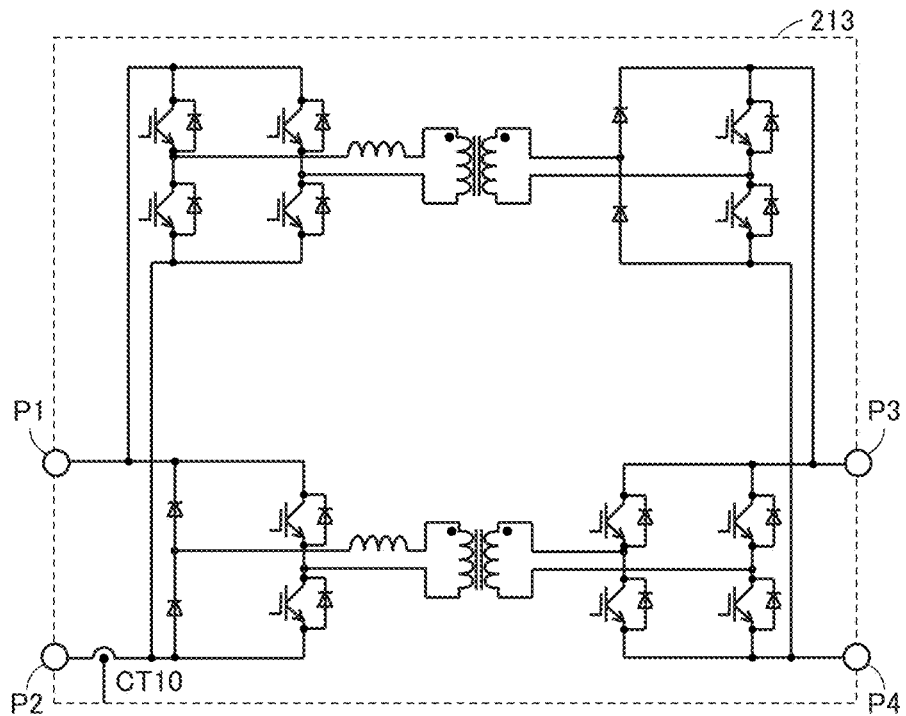
FIG. 42 is a view illustrating a third type of the bidirectional insulating converter 203.

Bidirectional insulating converter 203 can be replaced with bidirectional insulating converter 213 in FIG. 42 in which unidirectional insulating converter 204 and unidirectional insulating converter 214 are parallelized.

Figure 43:
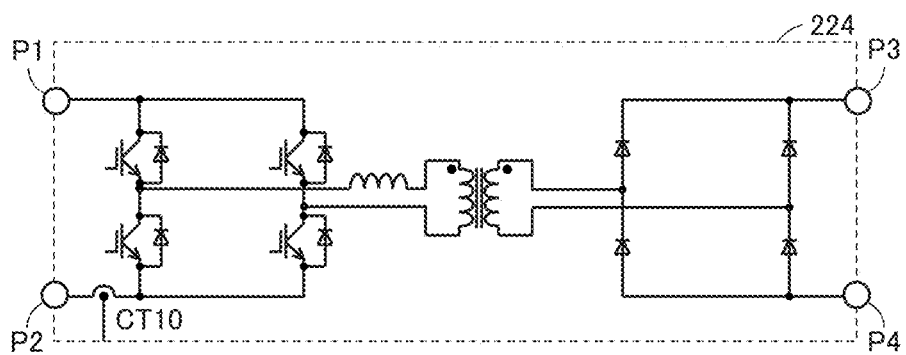
FIG. 43 is a view illustrating a fourth type of the bidirectional insulating converter 203.

Furthermore, when only the discharge mode and the range of 0.0 to 0.25 of duty instruction value D* are used, bidirectional insulating converter 203 can be replaced with unidirectional insulating converter 224 in FIG. 43.

Figure 44:
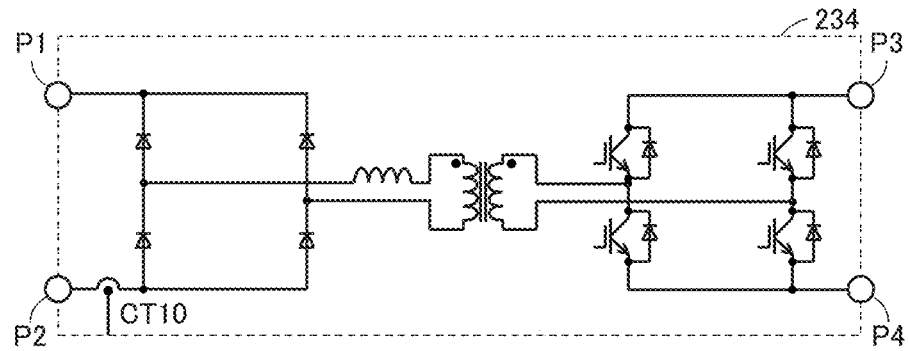
FIG. 44 is a view illustrating a fifth type of the bidirectional insulating converter 203.

Similarly, when only the charge mode and the range of −0.25 to 0.0 of duty instruction value D* are used, bidirectional insulating converter 203 can be replaced with unidirectional insulating converter 234 in FIG. 44.

Figure 45:
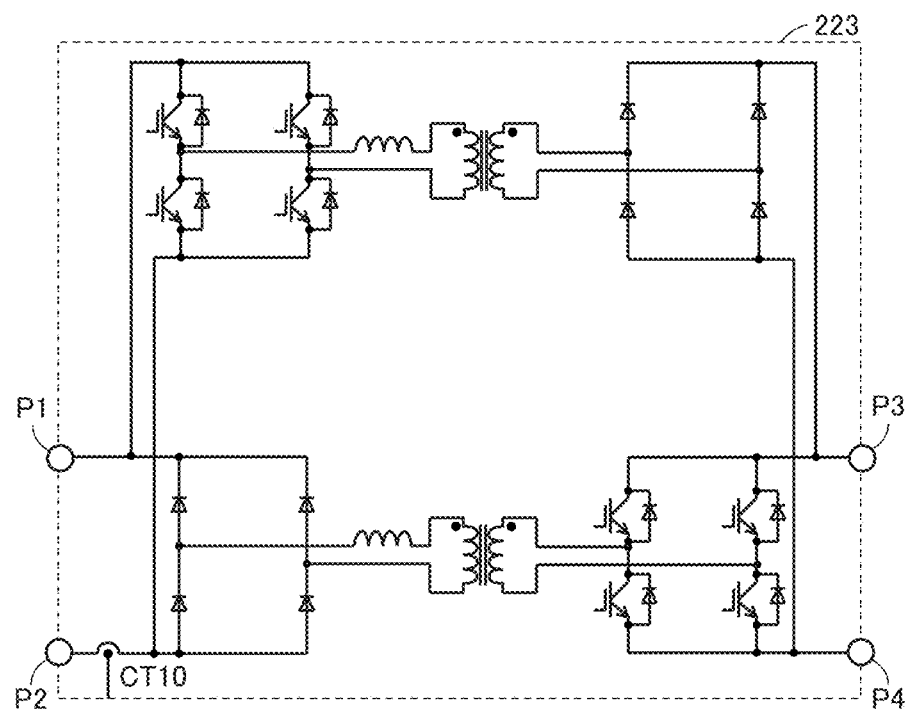
FIG. 45 is a view illustrating a sixth type of the bidirectional insulating converter 203.

When only the range of −0.25 to 0.25 of duty instruction value D* is used, bidirectional insulating converter 203 can be replaced with a bidirectional insulating converter 223 in FIG. 45 in which a unidirectional insulating converter 224 and a unidirectional insulating converter 234 are parallelized.

Unidirectional insulating converters 204, 214, 224, 234 and bidirectional insulating converters 213, 223 are included in the description of the operation of bidirectional insulating converter 203 described above, and thus can be applied to the power conversion device of the present embodiment similarly to bidirectional insulating converter 203.

Bidirectional insulating converters 213, 223 in FIGS. 42 and 45 exist as a converter having a type similar to bidirectional insulating converter 203. In bidirectional insulating converter 203, an insulation unit using transformer Tr is used for both the charge mode and the discharge mode. On the other hand, bidirectional insulating converters 213, 223 are different from bidirectional insulating converter 203 in that the insulation unit includes transformers separately in the charge mode and the discharge mode.

When bidirectional insulating converter 203 is replaced with bidirectional insulating converters 213, 223, it is necessary to set the condition in which the switching control signal is switched according to the polarity of duty instruction value D* in order to switch the circuit for the discharge mode and the circuit for the charge mode. In order to prevent a circulating current generated between the circuit for the discharge mode and the circuit for the charge mode, an AND condition in which the current of the primary side path of the insulation unit, the current of the secondary side path of the insulation unit, the detection value of current sensor CT10 that is the target of the current control, or the target value of the current control is less than or equal to a certain value is added to the above-described switching condition may be used when bidirectional insulating converters 213, 223 are used.

As described above, in the second embodiment, the typical insulating converter is illustrated in FIG. 10. In such an insulating converter, the current state takes four different states, and an element that performs switching changes as if the circuit is switched between the discharge mode and the charge mode. In addition, phase shift amounts φ1*, φ2* are calculated from duty instruction value D* by generation methods that are different in the loss reduction region and the high output region. In the second embodiment, it has been described that the change generated in the characteristic of the current control system adjusting the current of the switching circuit can be mitigated when such switching is generated.

Figure 46:
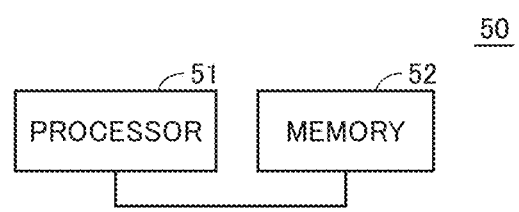
FIG. 46 is a view illustrating a configuration of a control device 50.

In the first and second embodiments, current controller 3, operation mode detector 4, and compensator 5 can be implemented by a control device 50 described below. FIG. 46 is a view illustrating a configuration of control device 50. Referring to FIG. 46, control device 50 includes a processor 51, a memory 52, and a communication interface (not illustrated). Processor 51 performs the control in order to generate the switching signal of the power conversion device according to the data stored in memory 52 and the information obtained through the communication interface.

Memory 52 is constituted with a random access memory (RAM), a read-only memory (ROM), a flash memory, and the like. An operating system, an application program, and various kind of data are stored in the flash memory. Each of current controller 3, operation mode detector 4, and compensator 5 in FIG. 1 is implemented by processor 51 executing the operating system and the application program stored in memory 52. When the application program is executed, various kinds of data stored in memory 52 are referred to.

Finally, the first and second embodiments will be summarized again with reference to the drawings.

Power conversion device 100 of the first embodiment includes switching circuit 200, PWM controller 6 corresponding to the "signal generator", current controller 3, operation mode detector 4, and compensator 5. Switching circuit 200 receives input voltage Vdc, and outputs output voltage VL. PWM controller 6 generates switching signals G10, G20, G30, G40 of the switching elements included in switching circuit 200 based on a first instruction value D*. Current controller 3 is configured to generate a second instruction value Dc* based on a deviation between the current target value and the current flowing through the switching circuit such that the current flowing through the switching circuit approaches the current target value. Operation mode detector 4 is configured to detect the operation mode of the switching circuit based on first instruction value D*. Compensator 5 adjusts second instruction value Dc* so as to compensate a gain that is a ratio between the deviation and the change amount of the current of switching circuit 200. Compensator 501 adjusts second instruction value Dc* so as to suppress the change in the gain based on an operation mode M detected by operation mode detector 4, and outputs first instruction value D*.

With such a configuration, operation mode detector 4 can detect or estimate the change in the operation mode of switching circuit 200 as viewed from current controller 3, the change being caused by the operation state, the operation instruction, or the circuit switching, and compensator 5 performs the compensation such that the gain change is suppressed.

In the first embodiment, as illustrated in Table 1, operation mode detector 401 detects the state in which the step-up operation and the step-down operation are switched with 1 of duty instruction value D* as the boundary. In the modification of the first embodiment, operation mode detector 402 detects the operation mode of the switching circuit based on input voltage Vdc and output voltage VL together with duty instruction value D* as illustrated in Table 3. The operation mode detected by operation mode detector 402 includes estimation of the DCM and the CCM in addition to the step-up operation and the step-down operation.

In the second embodiment, operation mode detector 403 is configured to detect the operation mode of the switching circuit based on input voltage Vdc and output voltage VL together with duty instruction value D* as illustrated in Table 5. Specifically, as illustrated in Table 5, operation mode detector 403 detects the state in which the charge operation and the discharge operation are switched with 0 of duty instruction value D* as the boundary, and estimates current states 1 to 4 in each of the charge operation and the discharge operation.

Preferably, in the first embodiment, compensator 501 is configured to calculate the compensation amount suppressing the change in the gain based on operation mode M output from operation mode detector 401 and second instruction value Dc*. In the second embodiment, compensator 503 is configured to compensate the gain so as to suppress the change in the gain based on operation mode M output from operation mode detector 403, input voltage Vdc, output voltage VL, and first instruction value D*.

At this point, switching circuit 200 includes any one of the following elements.

A first element is an element in which the operating state of the circuit is switched according to the magnitude of at least one of the current and the voltage of the switching circuit.

In the first embodiment, the first element is that the transfer functions (CCM and DCM) of the same duty instruction value D* are switched according to the magnitude of the current. On the other hand, in the second embodiment, the first element is that the transfer function (current operations 1 to 4) of the same duty instruction value D* is switched according to the magnitude of the voltage (input and output voltage ratio).

A second element is to switch the operation instruction generating a switching pulse after the instruction value related to the switching generation is subjected to different arithmetic processing with a certain value as the boundary. In the first embodiment, the second element is to switch the instruction arithmetic methods of D1* and D2* at the point where duty instruction value D* is matched with 0 as the boundary (FIGS. 5 and 6). On the other hand, in the second embodiment, the second element is to switch the instruction arithmetic methods of $\varphi1*$ and $\varphi2*$ at the point where duty instruction value D* is matched with 0 and ±0.25 as the boundary (FIGS. 17 to 19).

A third element is to switch the circuit according to the magnitude of at least one of the current and the voltage of the switching circuit, the target value input to the current controller, and the current of the adjustment target. In the first embodiment, the third element is at least one of the current and the voltage of bidirectional non-insulating converter 221 (FIG. 15), the target value input to the current controller, and the current of the adjustment target. In the second embodiment, the current is at least one of the current of the switching circuit of bidirectional insulating converters 213, 223 (FIGS. 42 and 45), the target value input to the current controller, and the current of the adjustment target.

Preferably, compensator 503 is configured to adjust at least one of the upper limit value and the lower limit value of first instruction value D* related to the generation of switching signals Gp1 to Gp4 and Gn1 to Gn4 such that the polarity of the gain is not inverted.

Thus, using the equations (27) to (40) of the second embodiment as an example, the operation of deviating from the movement in which ΔI also increases or decreases to the same polarity due to the increase or decrease in ΔD is limited. In general, feedback control is not stable unless a negative feedback configuration is adopted. Accordingly, as described in the second embodiment, the movement in which ΔI increases or decreases to the opposite polarity due to the increase or decrease in ΔD prevents the problem that the feedback system of the current control becomes the positive feedback.

Preferably, switching circuit 200 includes reactor L10. The current flowing through switching circuit 200 is determined based on input voltage Vdc, output voltage VL, first instruction value D* serving as a reference of switching signals G10, G20, G30, G40, and reactance of reactor L10. That is, the current flowing through switching circuit 200 can be expressed as the function of input voltage Vdc, output voltage VL, first instruction value D*, and the reactance of reactor L10.

This function corresponds to the equations (1), (2) in the case of the first embodiment, and corresponds to the equations (5) to (12) in the case of the second embodiment.

More preferably, PWM controller 601 corresponding to the "signal generator" compares first instruction value D* serving as the reference of switching signals G10, G20, G30, G40 with a triangular wave that is a carrier signal, and determines the on period and the off period of the switching element.

As described above, PWM controller 601 of the first embodiment adjusts pulse widths of switching signals G10, G20, G30, G40 by comparing duty instruction value D* with the triangular wave.

More preferably, the switching circuit (bidirectional insulating converter 203) includes first bridge FB10 that receives input voltage Vdc, second bridge FB20 that outputs output voltage VL, and transformer Tr disposed between first bridge FB10 and second bridge FB20 through reactor L13. The signal generator (PWM controller 603) gives a first phase difference and a second phase difference ($\varphi 1$, $\varphi 2$) to a signal in which the on period and the off period of the switching are constant, and generates switching signals Gp1 to Gp4 of first bridge FB10 and switching signals Gn1 to Gn4 of second bridge FB20. First instruction value D* serving as the reference of switching signals Gp1 to Gp4 and Gn1 to Gn4 corresponds to first phase difference $\varphi 1$ and second phase difference $\varphi 2$.

As described above, PWM controller 603 of the second embodiment adjusts the pulse phase difference by the phase shift instruction.

The embodiments disclosed herein are also planned to be implemented in appropriate combination within a range not contradictory. It should be considered that the disclosed embodiments are an example in all respects and not restrictive. The scope of the present invention is defined by not the description of the embodiments, but the claims, and it is intended that all changes within the meaning and scope of the claims are included in the present invention.

REFERENCE SIGNS LIST

3, 301, 303: current controller, 4, 401, 402, 403: operation mode detector, 5, 501, 502, 503: compensator, 6, 601, 603: controller, 10: DC power supply, 20: load, 50: control device, 51: processor, 52: memory, 100, 100A, 110: power conversion device, 200: switching circuit, 201, 202, 211, 221: non-insulating converter, 203, 213, 223: bidirectional insulating converter, 204, 214, 224, 234: unidirectional insulating converter, 232, 242: step-up converter, 233, 243: step-down converter, 244: switch, CT10: current sensor. D10, D20, D30, D40: diode, FB10: first bridge, FB20: second bridge, L10, L13: reactor, LG10, LG10A: first leg, LG20. LG20A: second leg, N1: first connection point, N2: second connection point, P1: first terminal. P2: second terminal, P3: third terminal. P4: fourth terminal. Q10, Q30, Sp1, Sp2, Sp3, Sp4: upper arm, Q20, Q40, Sn1, Sn2, Sn3, Sn4: lower arm, Tr: transformer, VT10, VT11, VT20: voltage sensor

The invention claimed is:

1. A power conversion device comprising:
a switching circuit to receive an input voltage to output an output voltage, the switching circuit including a reactor;
a signal generator to generate a switching signal of a switching element included in the switching circuit based on a first instruction value;
a current controller to generate a second instruction value based on a deviation between a current target value and the current flowing through the switching circuit such that the current flowing through the switching circuit approaches the current target value;
an operation mode detector to detect an operation mode of the switching circuit based on the first instruction value; and
a compensator to adjust the second instruction value so as to compensate a gain that is a ratio between the deviation and an amount of a change in the current of the switching circuit,
wherein the compensator is configured to adjust the second instruction value so as to suppress a change in the gain based on the operation mode detected by the operation mode detector, and outputs the first instruction value, and the current flowing through the switching circuit is determined using the input voltage, the output voltage, the first instruction value, and reactance of the reactor.

2. The power conversion device according to claim 1, wherein the operation mode detector is configured to detect the operation mode of the switching circuit based on the input voltage and the output voltage together with the first instruction value.

3. The power conversion device according to claim 1, wherein the compensator is configured to calculate a compensation amount suppressing the change in the gain based on the operation mode output from the operation mode detector and the first instruction value.

4. The power conversion device according to claim 3, wherein the compensator is configured to calculate the compensation amount suppressing the change in the gain based on the operation mode output from the operation mode detector, the input voltage, the output voltage, and the first instruction value.

5. The power conversion device according to claim 3, wherein the compensator is configured to adjust at least one of an upper limit value and a lower limit value of the first instruction value such that a polarity of the gain is not inverted.

6. The power conversion device according to claim 1, wherein the signal generator compares the first instruction value with a triangular wave that is a carrier signal, and determines an on period and an off period of the switching element.

7. The power conversion device according to claim 1, wherein the switching circuit includes:
a first bridge that receives the input voltage;
a second bridge that outputs the output voltage; and
a transformer disposed between the first bridge and the second bridge through a reactor, the signal generator generates switching signals of the first bridge and the second bridge by giving a first phase difference and a second phase difference to a signal in which an on period and an off period of switching are constant, and the first instruction value corresponds to the first phase difference and the second phase difference.

8. A power conversion device comprising:
a switching circuit to receive an input voltage to output an output voltage;
a signal generator to generate a switching signal of a switching element included in the switching circuit based on a first instruction value;
a current controller to generate a second instruction value based on a deviation between a current target value and the current flowing through the switching circuit such that the current flowing through the switching circuit approaches the current target value;

an operation mode detector to detect an operation mode of the switching circuit based on the first instruction value; and a compensator to adjust the second instruction value so as to compensate a gain that is a ratio between the deviation and an amount of a change in the current of the switching circuit, wherein the compensator is configured to adjust the second instruction value so as to suppress a change in the gain based on the operation mode detected by the operation mode detector, and outputs the first instruction value, the compensator is configured to calculate a compensation amount suppressing the change in the gain based on the operation mode output from the operation mode detector and the first instruction value, and the compensator is configured to adjust at least one of an upper limit value and a lower limit value of the first instruction value such that a polarity of the gain is not inverted.

* * * * *